United States Patent [19]

Kluger et al.

[11] Patent Number: 5,177,200

[45] Date of Patent: Jan. 5, 1993

[54] POLY(OXYALKYLENE) MODIFIED PHTHALOCYANINE COLORANTS

[75] Inventors: Edward W. Kluger, Pauline; John W. Rekers; David J. Moody, both of Spartanburg, all of S.C.

[73] Assignee: Milliken Research Corporation, Spartanburg, S.C.

[21] Appl. No.: 354,184

[22] Filed: May 19, 1989

[51] Int. Cl.⁵ .................. C08K 5/3472; C07D 209/56
[52] U.S. Cl. ...................... 540/122; 524/88; 528/60; 528/62; 540/131; 540/133; 540/134
[58] Field of Search ............... 540/122, 131, 133, 134; 564/86; 524/90, 88; 528/62, 60

[56] References Cited

U.S. PATENT DOCUMENTS

| | | | |
|---|---|---|---|
| 2,995,412 | 8/1961 | Kleb | 540/131 |
| 3,287,470 | 11/1966 | Pugin et al. | 540/133 |
| 4,284,729 | 8/1981 | Cross et al. | 528/53 |
| 4,634,555 | 1/1987 | Baxter et al. | 540/126 |
| 4,640,690 | 2/1987 | Baumgartner et al. | 8/506 |

FOREIGN PATENT DOCUMENTS 264674  11/1988  Japan ..................... 524/88

OTHER PUBLICATIONS

Cooper, Spectroscopic Techniques for Organic Chemists, [New York, J. Wiley, 1980] pp. 240 to 243.
Texaco Corp. Jeffamine brochure, 1984.

Primary Examiner—Robert T. Bond
Assistant Examiner—E. C. Ward
Attorney, Agent, or Firm—Timothy J. Monahan; H. William Petry

[57] ABSTRACT

A colorant for natural or synthetic resinous or polymeric materials, having the formula $A-[SO_2-N(R_2)-Y]_{1-4}$; wherein: $R_2$ is selected for example from hydrogen, methyl, cyclohexyl, phenyl or Y; A is a nonionic metallophthalocyanine chromophore which can be substituted for example with halogen, alkyl, alkoxy, alkylthio, or aryloxy; Y is a poly(oxyalkylene) moiety containing at least three monomeric units or mixtures thereof of the formula (—RO—) wherein each R is straight or branched alkylene of 2-4 carbons or mixtures thereof, up to about 20 mole percent of said monomeric units may be connected by one or more linking groups such as alkyleneoxy, —NH—, or —NH-CONH—, and wherein Y can be terminated by hydrogen, or by at branch subsituents, containing 1-3 groups or moieties selected from alkyl, cycloalkyl, acyl, or aryl; wherein any of the above recited hydrocarbon groups, moieties or substituents may themselves be substituted with up to four substituents selected, for example, from alkyl, halogen, mercapto, alkoxycarbonyl, hydroxy, alkoxy, or the like; and wherein each aliphatic hydrocarbon portion or moiety of the groups, moieties or substituents recited above contains from 1-20 carbons.

8 Claims, No Drawings

POLY(OXYALKYLENE) MODIFIED PHTHALOCYANINE COLORANTS

This invention concerns new colorant compositions, their manufacture and their uses and particularly concerns such compositions for the tinting or deeper coloring of natural and synthetic polymeric or resinous materials or substrates, especially polyurethanes and other thermosetting resins and polyolefins, wherein the chemical structures of the colorants are readily tailored to meet, in exceptional manner, the physical and chemical requirements of the specific industrial application.

Some of the desired physical and chemical characteristics of such colorants in addition to having at least substantial tinctorial power, include one or more of excellent clarity and light fastness, high heat stability, crystal structure and shade immutability, availability as liquids or at least good resin compatibility at processing temperatures for easy blending with the substrate, easy clean-up from processing, homogeneity of dispersal in the substrate, non-nucleating propensity of the colorant, and resistance to migration, settling, streaking, plating, subliming, blooming and the like of the colorant from the substrate.

Other desirable colorant properties and also other problems often encountered with the use of pigment material are discussed in U.S. Pat. No. 4,284,729 the disclosure of which is incorporated herein by reference. In that patent which is principally concerned with coloring thermosetting or cross-linkable resins, it is disclosed that conventional organic dyes can be modified with poly(oxyalkylene) constituents which carry reactive groups for entering the colorant into the polymer chain, e.g., by condensation. This technique is indicated as providing a mechanism whereby highly efficient (high tinctorial power) conventional organic dyes can readily be incorporated, chemically, into the resin molecule such that the dyes become essentially nonmigratory Similarly, in U.S. Pat. No. 4,640,690 the disclosure of which is incorporated herein by reference, it is taught to color thermoplastic resins with compounds which contain conventional types of organic dyes such as azo, anthraquinone, triarylmethane and methine, linked directly to poly(oxyalkylene) moiety through a nitrogen, oxygen or sulfur atom or a carboxyl group.

It is noted that in these patents the methods for associating the poly(oxyalkylene) moieties with the chromophore are specific to the reactants. For example, in the preparation of azo containing colorants, an aromatic amine is reacted with an alkylene oxide under basic conditions. Similarly, where the poly(oxyalkylene) is attached directly to an anthraquinone nucleus the method comprises reacting a hydroxyl substituted anthraquinone with an amino group on a poly(oxyalkylene). Neither of these nor similar methods are useful in the present invention.

It has been found, moreover, that the use of such conventional organic dye moieties in thermosetting substrates limits the utility of the product in, e.g., high temperature applications for which the substrate material may actually have been designed. This results from the inherent instability of the conventional organic dye moiety at the higher use or processing temperatures of the product substrate.

Also noted here are the copper phthalocyanine (CuPc) compounds of U.S. Pat. No. 4,634,555 which are solids in contrast to the great majority of the compounds of the present invention. The liquid colorants are quite easily blended uniformly with a variety of thermoplastic or thermosetting resins. In contrast, the solid prior art CuPc compositions would need to be converted into fine particles and then blended in conventional equipment which necessarily is time consuming and operator intensive, and incurs homogeneity problems, substantial power requirements, and great difficulty in handling and equipment clean-up.

Objects, therefore, of the present invention are to provide colorants, the physical and chemical properties of which are readily modifiable to adapt them for blending or incorporation into various polymeric substrates, especially in thermosetting resin materials, wherein the colorants exhibit one or more of the aforementioned characteristics of substantial tinctorial power, light fastness excellent clarity, high heat stability(crystal structure and shade immutability), availability as liquids for easy blending with the substrate; to give essentially complete homogeneity of colorant, easy clean-up from processing, non-nucleating propensity, and resistance to migration, settling, streaking, plating, subliming, blooming and the like of the colorant from the substrate; to provide compositions comprising polymeric substrates, especially polyurethane foams, tinted or deeper colored with the present colorants; and to provide a highly efficient and non-complex process for the manufacture of the present colorants.

These and other objects hereinafter becoming evident have been attained in accordance with the present invention in which the colorant has the formula A—[-SO$_2$—N(R$_2$)—Y]$_{1-4}$ wherein:

A is a nonionic metallophthalocyanine chromophore which can be substituted or unsubstituted;

R$_2$ is selected from hydrogen or unsubstituted or substituted alkyl, cycloalkyl, aryl or Y;

Y is a poly(oxyalkylene) moiety comprised of at least about 50 mole percent, preferably at least 70 mole percent, of monomeric units or mixture thereof of the formula (—RO—) wherein each R is substituted or unsubstituted straight or branched alkylene of 2-4 carbons or mixtures thereof; and wherein each aliphatic hydrocarbon portion or moiety of the groups, moieties or substituents recited above contains from 1-20 carbons In certain preferred embodiments:

(a) A is a nonionic metallophthalocyanine chromophore which can be substituted with 1-8 substitutents selected from halogen, alkyl, alkoxy, alkylthio, or aryloxyl; Y is a poly(oxyalkylene) moiety comprised of at least three monomeric units or mixture thereof of the formula (—RO—) wherein, each R is straight or branched alkylene of 2-4 carbons or mixtures thereof, up to about 20 mole percent of said monomeric units may be connected by one or more linking groups selected from alkyleneoxy, aryleneoxy, alkylenedioxy, alkylenetrioxy, —N(R$_3$)—, or —N(R$_2$)CON(R$_2$)—, wherein each R$_3$ is selected from R$_2$ or —SO$_2$—A, and wherein Y can be terminated by hydrogen, or by or contain as branch substituents, 1-3 groups or moieties selected from alkyl, cycloalkyl, acyl, or aryl; wherein any of the above recited hydrocarbon groups, moieties or substituents may themselves be substituted, for example, with up to four substituents selected from alkyl, halogen, mercapto, alkylthio, arylthio, aryl, cycloalkyl, alkoxycarbonyl, hydroxy, alkoxy, alkylenedioxy, —N(R$_2$)CO(R$_2$)(R$_2$), —N(R$_2$)(R$_2$), —N(R$_2$)SO$_2$—A, —N(R$_2$)acyl, acyloxy or the like substituents which are known in the art; and wherein each aliphatic hydrocarbon portion or moiety of the groups, moieties or substituents recited above contains from 1–12, preferably 1–4 carbons.

(b) Y has an average molecular weight of from about 200 to about 1500;

(d) Y is terminated with hydrogen or a group selected from alkyl, aryl, acyl, alkoxyalkyl, mono- or dihydroxyalkyl, acyloxyalkyl, or a group of the formula:

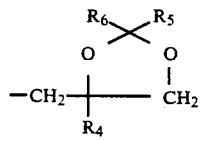

wherein each of $R_4$, $R_5$, and $R_6$ is selected from hydrogen, alkyl, or aryl;

(e) the total mole percentage of all —(RO)— unit linking groups relative to all said —(RO)— units in Y is from zero to about 20 percent;

(f) $R_2$ is hydrogen or Y;

(g) R is —$CH_2CH_2$—, —$CH(CH_3)CH_2$—, —$CH(C_2H_5)CH_2$— or mixtures thereof;

(h) the chromophore is an unsubstituted phthalocyanine of Cu, Ni or Al;

(i) the polymeric or resinous material composition contains from about 0.001 to about 10.0 weight percent of one or a mixture of any of the colorants as defined above;

(j) the material is thermoplastic:

(k) the material is polyurethane; and (l) the process for preparing the colorant comprises reacting at a temperature of e.g., from about 0° C. to about 100° C., a metallophthalocyanine of the formula A—$(SO_2X)_{1-4}$ with at least a stoichiometric quantity of an amine of the formula $HN(R_2)Y$ wherein X is selected from Cl, F, Br, I, or alkoxy, and A, $R_2$, and Y are as defined above. Preferred reaction media include water, alcohols or ethers containing acid acceptors such as alkali metal carbonates, hydroxide or tertiary amines. Other more specific and preferred process embodiments will hereinafter become evident. With reference to the above general formula for the colorant, the phthalocyanine chromophore can be provided with one to four —$SO_2X$ groups, each of which can be reacted with a reactive amine group $HN(R_2)$— which can be on the same or different ones of the poly(oxyalkylene) moieties Y. In this regard it is noted that where the Y moiety is large, steric hinderance is less likely to interfere with the reaction of multiple $HN(R_2)$-groups spaced thereon with multiple $SO_2X$ groups on the same phthalocyanine chromophore.

Thermoplastic resins which may be used according to the present invention include a wide range of resins and synthetic resin compositions which are known in the art as being essentially thermoplastic in nature. The term "thermoplastic" is used herein in its conventional sense to mean a resin "having the property of softening or fusing when heated and of hardening again when cooled" (see Webster's Seventh Collegiate Dictionary, G & C Merriam Co., 1965). Thermoplastic resins are to be clearly distinguished both in terms of their essential physical and chemical characteristics from thermosetting resins. The term "thermosetting" used herein is also used in its conventional sense to means a resin having the property of becoming permanently rigid when heated or cured.

Examples of thermoplastic resin systems which may be employed include a wide range of polyolefin polymers, e.g., polyethylene, linear low density polyethylene, polyproplene, polybutylene, and copolymers made from ethylene, propylene and/or butylene. Other thermoplastic polymers which may be employed according to the present invention include polyvinyl chloride, polyvinylidene chloride, cellulosic resins such as cellulose acetate, cellulose acetate butyrate and cellulose acetate propionate, acrylic resins such as polymethyl methacrylate, styrene acrylonitrile, polystyrene, polycarbonate and acrylonitrile butadiene styrene (therein ABS), polyamides such as nylon 6 and nylon 66 and polyesters such as polyethylene terephthalate, especially glycol modified polyethylene terephthalate and polybutylene terephthalate.

As mentioned above, the colorants may be employed in the thermoplastic resins in a minor amount sufficient to provide the desired degree of coloration in the resin. The actual amount used will, in addition to the desired depth of shade, depend upon the tinctorial strength of the chromophore used and the overall molecular weight of the colorant, e.g., chromophore plus poly(oxyalkylene) chain length. Typically the amount of colorant employed may be from about 0.001 percent to about 10 percent, preferably from about 0.001 percent to about 3 percent, and most preferably from about 0.1 to about 1.0 percent by weight based upon the overall weight of the resin composition.

Other conventional additives may also be present in the resin compositions of the present invention. For instance, such additives may include plasticizers, antioxidants, light, UV, and heat stabilizers, lubricants, flame retardants, nucleating agents and other additives which will be readily identified by those skilled in the art. In general, the colorants have been observed to have little or no adverse interactions with these conventional additives.

Because the colorants if used properly ordinarily do not detract from the clarity of the resin, it has been found that additives which improve the clarity of such resins may be particularly desirable for use in combination with colorants as described herein to provide resin products that are both colored and which also have excellent clarity. One particular class of additives which have been found to be useful in this regard are the benzylidene sorbitols including substituted benzylidene sorbitols such as those described in U.S. Pat. No. 4,016,118 to Hamada, et al. (E.C. Chemical); U.S. Pat. No. 4,371,645 to Mahaffey (Milliken Research Corporation); and Japanese Pat. No. SHO [1977] 53-117044 to Kobsyashi, et al. (New Japan Chemical); all of these patents being hereby incorporated herein by reference. The particular shade of the colorant will depend primarily upon the particular chromophore group selected. A large variety of colors and shades may be obtained by blending two or more colorants. Blending the colorants of the present invention can be readily accomplished as the colorants are polymeric materials which may have substantially identical solubility characteristics, which are dictated by the nature of the polymeric chain. Therefore, the colorants are in general soluble in one another, and are also in general completely compatible with each other.

According to the process of the invention, the colorant may be incorporated into the thermoplastic resin using conventional techniques such as those employed to incorporate other additives in such resins. For instance, the colorant may be incorporated into the resin by simply adding it to the resin while the resin is in a plasticized or molten state, typically prior to formation of the polymer into its final shape, e.g., by molding, extrusion, blow-molding and the like. For instance when the thermoplastic resin to be colored is a polyolefin resin the process may be carried out by adding a colorant comprised of a poly(oxyalkylene) substituted chromophore group directly to the molten polymer, by tumbling it onto a pre-extruded pelletized resin, or by mixing it into the resin powder prior to extrusion. The polymer may then be molded or extruded in the usual manner, i.e., in the same way as for polyolefin resins which are not colored. Details about these procedures may be found in the relevant literature.

Alternatively, a concentrate of the colorant in an appropriate resin or vehicle may first be prepared Such concentrate may contain an appropriately high percentage of colorant. The concentrates may be in the form of liquids, solids, e.g., powders, pellets, etc., as may be desired. These concentrates may then incorporated into the thermoplastic resin as is well understood in the art.

The colorants used in the process and in the composition of the present invention are polymeric colorants which may according to one embodiment be in the liquid phase. Thus, if in the liquid phase, they may be added to the thermoplastic polymer melt in solvent-free form rather than in the form of solutions or dispersions in a suitable solvent or dispersing medium. Obviously, liquids may have certain processing advantages over solids, and moreover liquids may, if desired, be added directly to the molten polymer and therefore contain no extraneous solvent or dispersing agents. This process may, therefore, provide unusual and advantageous properties in the final thermoplastic resin product. Alternatively, however, the colorants may be premixed with minor amounts of or solvent or dispersing agent which is compatible with the resin, thus providing certain processing advantages.

According to the process of the invention, the liquid colorant may be incorporated into the thermosetting resins by simply adding it to the reaction mixture or to one of the components of the reaction mixture before or during the poly-addition reaction. For instance, when the thermosetting resin to be colored is a polyurethane resin the process may be carried out by adding the coloring agent in the form of a liquid to the polyol or even in some instances to the polyisocyanate component of the reaction mixture either before or during polyurethane formation. The subsequent reaction may be carried out in the usual manner, i.e., in the same way as for polyurethane resins which are not colored. Details about this procedure may be found in the relevant literature.

The present coloring agents of one embodiment of the present invention are polymeric, liquid, reactive coloring agents. Thus, they may be added to the reaction mixture or to one of the components thereof in solvent-free form rather than in the form of solutions or dispersions in suitable solvent or dispersing medium. Obviously liquids have significant processing advantages over solids, and moreover liquids of the present invention may, if desired, be added directly to the reaction mixture and therefore contain no extraneous nonreactive solvent or dispersing agent. This process may, therefore, provide unusual and advantageous properties in the final thermoset resin product. Alternatively, however, the coloring agent may be premixed with minor amounts of one or more of the precursors of the polymeric product, thus providing certain processing advantages.

The thermosetting resins to which the process of the present invention may be applied may be made by the reaction of a nucleophile with an electrophile. Examples of such resins include alkyds, allylics, the amines, e.g., melamine and urea, epoxies, phenolics, polyesters, silicones and urethanes. The thermosetting resin colored according to the present invention can be used in a variety of different end uses. e.g., as moldings, sealants, elastomers, films, fibers, lacquers, coating and foamed materials. It has been found in particular that the present colorants may quite advantageously be employed for the production of foams, such as polyurethane foams which may be soft, semi-rigid or rigid foams, or the so-called polyurethane integral skin and microcellular foams. Such foams are useful for producing shaped products by injection molding, extrusion or calendaring and may be obtained by adding the liquid coloring agent to the polyol or diol component of the reaction mixture, or to one of the other components, although addition to the polyol component is preferred. The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The colorant may also be admixed with chain extending diols, e.g., ethylene glycol, diethylene glycol and butane diol. In general, it is desirable not to use more than about 20 percent by weight of colorant based on the weight of polyol. In most cases very strong colorations are produced with a small proportion of the colorant, for example, from about 0.1 to about 2 percent, preferably 0.5 to 1 percent by weight colorant based on the weight of polyol.

Because the present colorants are, in themselves, polymeric compounds, they may he soluble, for instance, in most polyols which would be used in polyurethane manufacture, in most epoxy formulations, in polyester formulations and themselves in admixtures. This property may be particularly valuable in that this solubility may permit rapid mixing and homogeneous distribution throughout the resin, thus eliminating shading differences and streaks when properly mixed, the colorant may have no tendency to settle as would be the base with pigment dispersions, and it is possible to prepare a blend of two or more colorants which provides a wide range of color availability.

The present liquid reactive coloring agents may also be of considerable value in reaction injection molding (RIM) applications. The RIM process is a method of producing molded polyurethanes and other polymers wherein the two reactive streams are mixed while being poured into a mold. Upon reaction, the polymer is "blown" by chemicals to produce a foam structure. This process may be hindered by the presence of solid particles, such as conventional pigments. The present invention may not cause this hinderance because there are no particles in the system and the colorant becomes part of the polymer through reaction with one of the components.

Commercially available and preferred amines from which the present preferred colorants are prepared are the JEFFAMINE series described in Texaco Chemical Company, New Product Development brochures as the M, D, ED, DU, BUD, T, MNPA: and EDR series: the disclosures of which are incorporated herein by reference and copies of which are transmitted herewith.

The preferred amines finding special utility in the present invention are as follows:

$R_9$—$O(C_2H_4O)_a[CH_2CH(CH_3)O]_bCH_2CH(CH_3)NH_2$
$R_9$—$O(C_2H_4O)_a[CH_2CH(C_2H_5)O]_bCH_2CH(CH_3)NH_2$
$R_9$—$O(C_2H_4O)_a[CH_2CH(C_2H_5)O]_bCH_2CH(C_2H_5)NH_2$
$R_9$—$O(C_2H_4O)_a[CH_2CH(CH_3)O]_bCH_2CH(C_2H_5)NH_2$
$R_9$—$O[CH_2CH(CH_3)O]_aCH_2CH(CH_3)NH_2$
$R_9$—$O[CH_2CH(C_2H_5)O]_aCH_2CH(C_2H_5)NH_2$
$R_9$—$O[CH_2CH(C_2H_5)O]_aCH_2CH(CH_3)NH_2$
$R_9$—$O[CH_2CH(CH_3)O]_aCH_2CH(C_2H_5)NH_2$ wherein a=1-19; b=2-31; and $R_9$ is selected from $CH_3$, $C_2H_5$, n-$C_3H_7$, n-$C_4H_9$, n-$C_5H_{11}$, or n-$C_6H_{13}$.

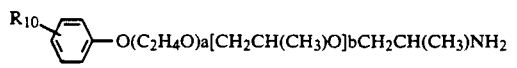
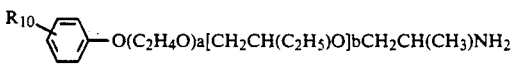
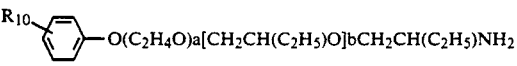
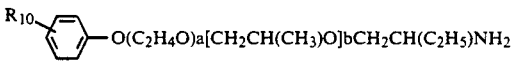
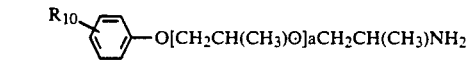
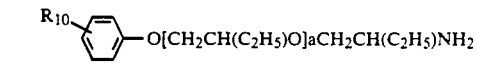
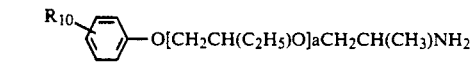

wherein a=1-19; b=2-31; and $R_{10}$ is selected from $CH_3$, $C_2H_5$, $C_4H_9$, $C_9H_{19}$, $OCH_3$, $OC_2H_5$, or $OC_4H_9$.

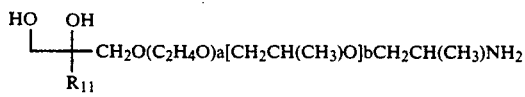
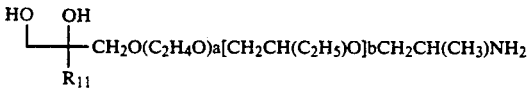
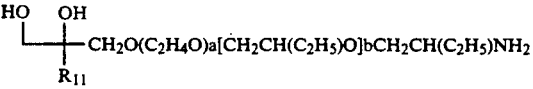
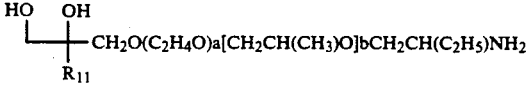
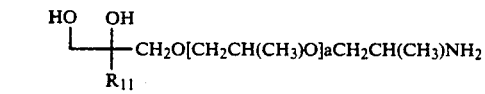
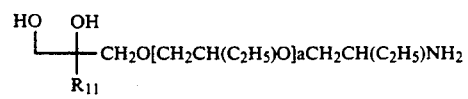
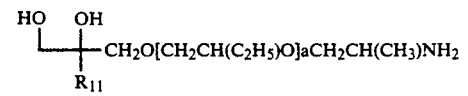
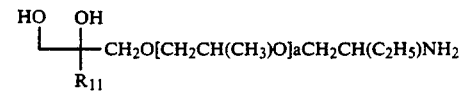

wherein a=1-19; b=2-31; and $R_{11}$ is selected from hydrogen, $CH_3$, or $C_2H_5$.

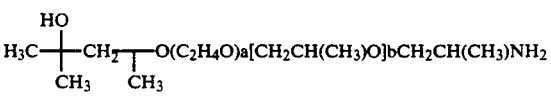
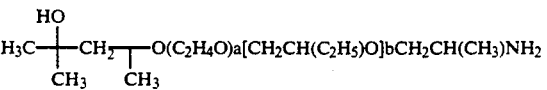
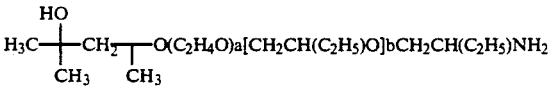
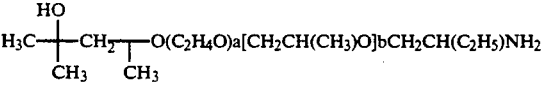
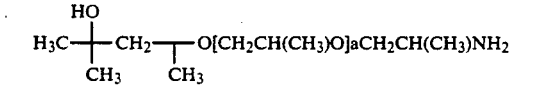
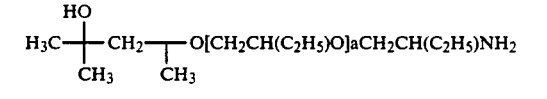
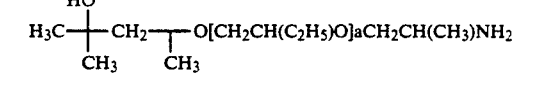

wherein A=1-19; b=2-31.

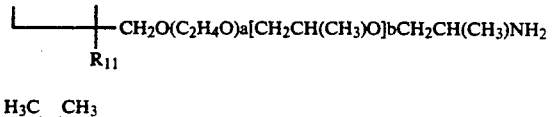
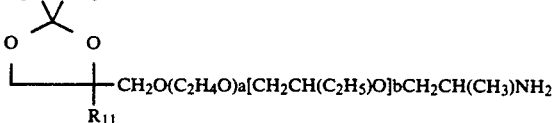

-continued

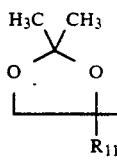
—CH₂O(C₂H₄O)a[CH₂CH(C₂H₅)O]bCH₂CH(C₂H₅)NH₂

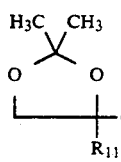
—CH₂O(C₂H₄O)a[CH₂CH(CH₃)O]bCH₂CH(C₂H₅)NH₂

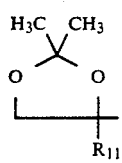
—CH₂O[CH₂CH(CH₃)O]aCH₂CH(CH₃)NH₂

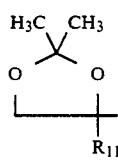
—CH₂O[CH₂CH(C₂H₅)O]aCH₂CH(C₂H₅)NH₂

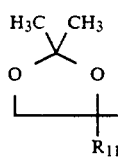
—CH₂O[CH₂CH(C₂H₅)O]aCH₂CH(CH₃)NH₂

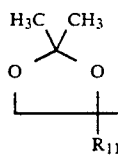
—CH₂O[CH₂CH(CH₃)O]aCH₂CH(C₂H₅)NH₂ wherein a=1-19; b=2-31; and $R_{11}$ is recited above.

H₂NCH(CH₃)CH₂[OCH(CH₃)CH₂]a(OCH₂CH₂)b[OCH₂CH(CH₃)]cNH₂

H₂NCH(CH₃)CH₂[OCH(CH₂H₅)CH₂]a(OCH₂CH₂)b[OCH₂CH(CH₃)]cNH₂

H₂NCH(CH₃)CH₂[OCH(C₂H₅)CH₂]a(OCH₂CH₂)b]OCH₂CH(C₂H₅)]cNH₂

H₂NCH(CH₂H₅)CH₂[OCH(C₂H₅)CH₂]a(OCH₂CH₂)b]OCH₂CH(C₂H₅)]cNH₂

H₂NCH(CH₃)CH₂[OCH(C₃)CH₂]a(OCH₂CH₂)b]OCH₂CH(C₂H₅)]cNH₂

H₂NCH(CH₃)CH₂[OCH(CH₃)CH₂]aNH₂

H₂NCH(CH₂H₅)CH₂[OCH(CH₂H₅)CH₂]aNH₂ wherein b=4-132; and a+c=2-5.

H₂N(CH₃)CHCH₂[OCH₂CH(CH₃)]aHN(CO)NH[CH(CH₃)CH₂O]bCH₂CH(CH₃)NH₂

H₂N(C₂H₅)CHCH₂[OCH₂CH(C₂H₅)]aHN(CO)NH[CH(C₂H₅)CH₂O]bCH₂CH(CH₂H₅)NH₂

H₂N(CH₃)CHCH₂[OCH₂CH(CH₂H₅)]aHN(CO)NH[CH(C₂H₅)CH₂O]bCH₂CH(CH₃)NH₂

H₂N(C₂H₅)CHCH₂[OCH₂CH(CH₃)]aHN(CO)NH[CH(CH₃)CH₂O]bCH₂CH(CH₂H₅)NH₂ wherein a=2-68 and b=2-68.

HOCH(CH₃)CH₂NHCH(CH₃)CH₂[OCH₂CH(CH₃)]aNHCH₂CH(CH₃)OH wherein a is 2.6.

$R_{11}$—⟨ CH₂O(C₂H₄O)c[CH₂CH(CH₃)O]zCH₂CH(CH₃)NH₂
CH₂O(C₂H₄O)b[CH₂CH(CH₃)O]yCH₂CH(CH₃)NH₂
CH₂O(C₂H₄O)a[CH₂CH(CH₃)O]xCH₂CH(CH₃)NH₂

$R_{11}$—⟨ CH₂O(C₂H₄O)c[CH₂CH(C₂H₅)O]zCH₂CH(C₂H₅)NH₂
CH₂O(C₂H₄O)b[CH₂CH(C₂H₅)O]yCH₂CH(C₂H₅)NH₂
CH₂O(C₂H₄O)a[CH₂CH(C₂H₅)O]xCH₂CH(C₂H₅)NH₂

$R_{11}$—⟨ CH₂O(C₂H₄O)c[CH₂CH(C₂H₅)O]zCH₂CH(CH₃)NH₂
CH₂O(C₂H₄O)b[CH₂CH(C₂H₅)O]yCH₂CH(CH₃)NH₂
CH₂O(C₂H₄O)a[CH₂CH(C₂H₅)O]xCH₂CH(CH₃)NH₂

$R_{11}$—⟨ CH₂O(C₂H₄O)c[CH₂CH(CH₃)O]zCH₂CH(C₂H₅)NH₂
CH₂O(C₂H₄O)b[CH₂CH(CH₃)O]yCH₂CH(C₂H₅)NH₂
CH₂O(C₂H₄O)a[CH₂CH(CH₃)O]xCH₂CH(C₂H₅)NH₂

$R_{11}$—⟨ CH₂O[CH₂CH(CH₃)O]zCH₂CH(CH₃)NH₂
CH₂O[CH₂CH(CH₃)O]yCH₂CH(CH₃)NH₂
CH₂O[CH₂CH(CH₃)O]xCH₂CH(CH₃)NH₂

$R_{11}$—⟨ CH₂O[CH₂CH(C₂H₅)O]zCH₂CH(C₂H₅)NH₂
CH₂O[CH₂CH(C₂H₅)O]yCH₂CH(C₂H₅)NH₂
CH₂O[CH₂CH(C₂H₅)O]xCH₂CH(C₂H₅)NH₂

$R_{11}$—⟨ CH₂O[CH₂CH(CH₃)O]zCH₂CH(C₂H₅)NH₂
CH₂O[CH₂CH(CH₃)O]yCH₂CH(C₂H₅)NH₂
CH₂O[CH₂CH(CH₃)O]xCH₂CH(C₂H₅)NH₂

$R_{11}$—⟨ CH₂O[CH₂CH(C₂H₅)O]zCH₂CH(CH₃)NH₂
CH₂O[CH₂CH(C₂H₅)O]yCH₂CH(CH₃)NH₂
CH₂O[CH₂CH(C₂H₅)O]xCH₂CH(CH₃)NH₂ wherein a+b+c=1-80; and x+y+z=5-85; and $R_{11}$ is recited above.

The following examples illustrate preparation of the present colorants, parts and percentages, unless otherwise stated being by weight. The abbreviation EO, PO, and BO refer to —CH₂CH₂O—, —CH(CH₃)CH₂O— and —CH(C₂H₅)CH₂O—, respectively.

EXAMPLE 1

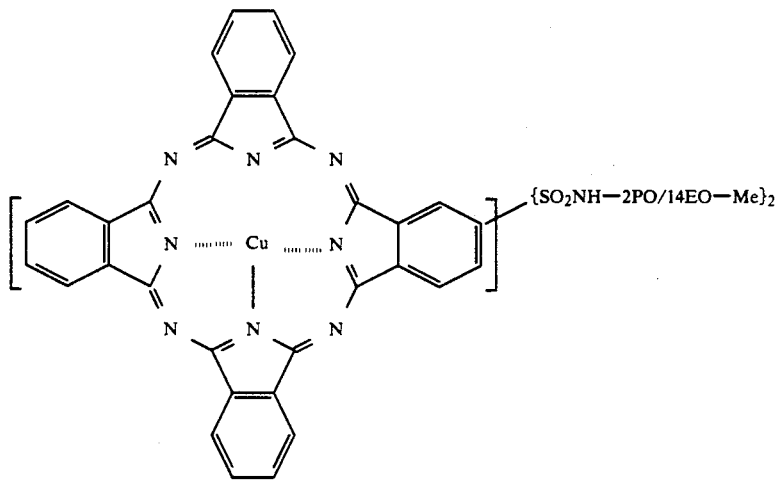

A mixture was prepared by adding 189.6 grams (0.26 moles) of a primary amine with an amine equivalent weight of 1.35 meq/g) to 31.4 grams of sodium carbonate(0.30 moles) in 250 grams of water. The mixture was stirred mechanically and cooled to 10°–15° C., and 259 grams (0.105 moles) of a 33% active aqueous wet cake of freshly prepared copper phthalocyaninesulfonyl chloride derivative(containing an average of about 2 chlorosulfonyl groups per molecule) were added to the mixture over one and a half hours. After the addition was complete, the mixture was warmed to 50° C. for an additional two hours to insure complete reaction. Afterwards, the mixture was cooled and the product was extracted into methylene chloride. The methylene chloride solution was separated from the salt water solution, washed several times with water to neutral pH, and dried over anhydrous magnesium sulfate. The dried methylene chloride solution was filtered and stripped under reduced pressure at 90° C. to give a blue liquid with an absorbance at 667 nm.

EXAMPLE 2

A mixture was prepared by adding 91.0 grams (0.19 moles) of a primary amine with an amine equivalent weight of 2.10 meq/g) to 24.0 grams (0.23 moles) sodium carbonate in 400 ml of THF. The mixture Was cooled to 10°–15° C. and 100 grams (0.061 moles) of a 50% active aqueous wet cake of freshly prepared copper phthalocyanine-sulfonyl chloride derivative (containing an average of about 2 chlorosulfonyl groups per molecule) were added to the mixture over one and a half hours. After the addition was complete, the mixture was warmed to 50° C. for an additional two hours to insure complete reaction. The aqueous THF solution was allowed to evaporate in a fume hood, 300 ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to a blue liquid with an absorbance at 667 nm.

EXAMPLE 3

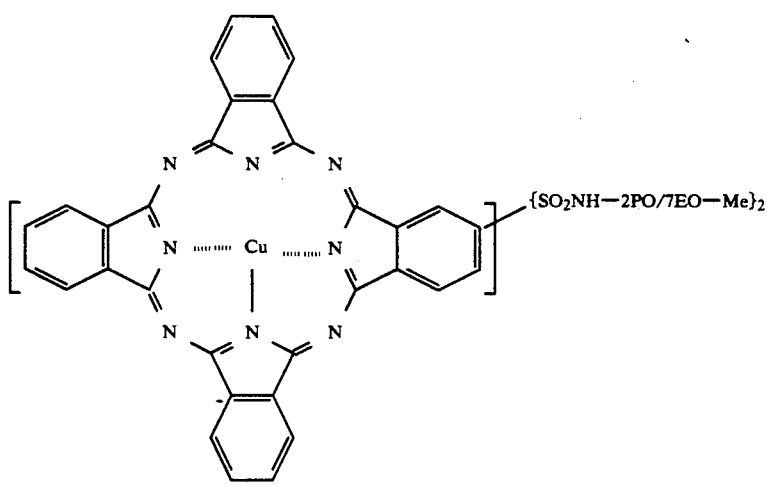

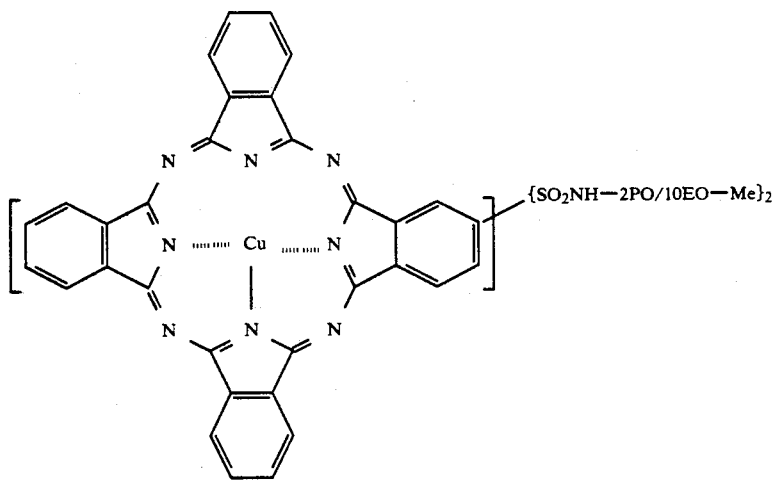

A mixture was prepared by adding 81.7 grams (0.14 moles) of a primary amine with an amine equivalent weight of 1.68 meq/g to 24.0 grams (0.23 moles) sodium carbonate in 400 ml of THF. The mixture was cooled to 10°-15° C. and 113 grams (0.046 moles) of a 50% active aqueous wet cake of freshly prepared copper phthalocyanine-sulfonyl chloride derivative (containing an average of about 2 chlorosulfonyl groups per molecule) were added to the mixture over one and a half hours. After the addition was complete, the mixture was warmed to 50° C. for an additional two hours to insure complete reaction. The aqueous THF solution was allowed to evaporate in a fume hood, 300 ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to a blue liquid with an absorbance at 667 nm.

EXAMPLE 4

A mixture was prepared by adding 71.4 grams (0.10 moles) of a primary amine with an amine equivalent weight of 1.35 meq/g to 21.6 grams (0.20 moles) sodium carbonate in 500 ml of water. The mixture was cooled to 10°-15° C. and 0.026 moles of an aqueous wet cake of freshly prepared copper phthalocyaninesulfonyl chloride derivative (containing an average of about 4 chlorosulfonyl groups per molecule) was added to the mixture over one-half hour. After the addition was complete, the mixture was warmed to 50° C. for an additional two hours to insure complete reaction. Afterwards, the mixture was cooled and the product was extracted into methylene chloride. The methylene chloride solution was separated from the salt water solution, washed several times with water to neutral pH, and dried over anhydrous magnesium sulfate. The dried methylene chloride solution was filtered and stripped under reduced pressure at 90° C. to give a blue liquid with an absorbance at 667 nm.

EXAMPLE 5

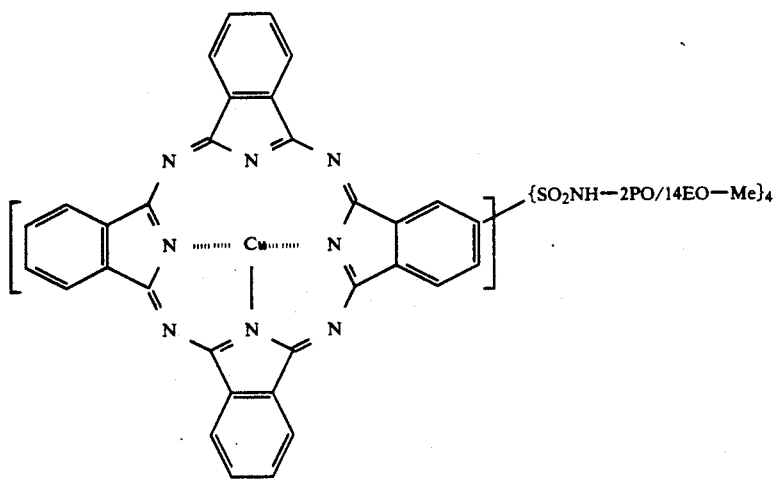

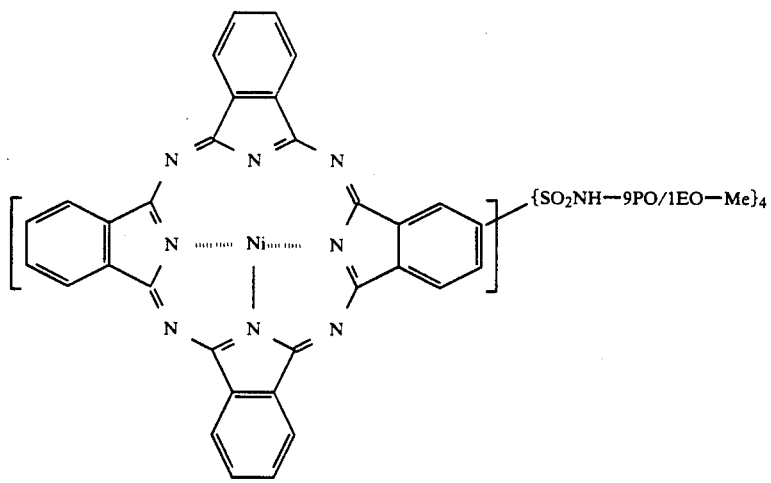

A mixture was prepared by adding 244.8 grams (0.41 moles) of Jeffamine M-600 primary amine with an amine equivalent weight of 1.66 meq/g to 173.0 grams (1.63 moles) sodium carbonate in 1000 ml of water. The mixture was cooled to 10°–15° C. and 0.10 moles of an aqueous wet cake of freshly prepared nickel phthalocyaninesulfonyl chloride derivative (containing an average of about 4 chlorosulfonyl groups per molecule) was added to the mixture about one hour. When the addition was complete, the mixture was warmed to 50° C. to for an additional two hours to insure complete reaction. Afterwards, the mixture was cooled and the product was extracted into methylene chloride. The methylene chloride solution was separated from the salt water solution, washed several times with water to neutral pH, and dried over anhydrous magnesium sulfate. The dried methylene chloride solution was filtered and stripped under reduced pressure at 90° C. to give a blue liquid with an absorbance at 660 nm.

EXAMPLE 6

A mixture was prepared by adding 71.4 grams (0.10 moles) of a primary amine with an amine equivalent weight of 1.35 meq/g to 21.6 grams (0.20 moles) sodium carbonate in 500 ml of water. The mixture was cooled to 10°–15° C. and 0.025 moles of an aqueous wet cake of freshly prepared nickel phthalocyaninesulfonyl chloride derivative (containing an average of about 4 chlorosulfonyl groups per molecule) was added to the mixture over about one hour. When the addition was complete, the mixture was warmed to 50° C. to for an additional two hours to insure complete reaction. Afterwards, the mixture was cooled and the product was extracted into methylene chloride. The methylene chloride solution was separated from the salt water solution, washed several times with water to neutral pH, and dried over anhydrous magnesium sulfate. The dried methylene chloride solution was filtered and stripped under reduced pressure at 90° C. to give a blue liquid with an absorbance at 662 nm.

EXAMPLE 7

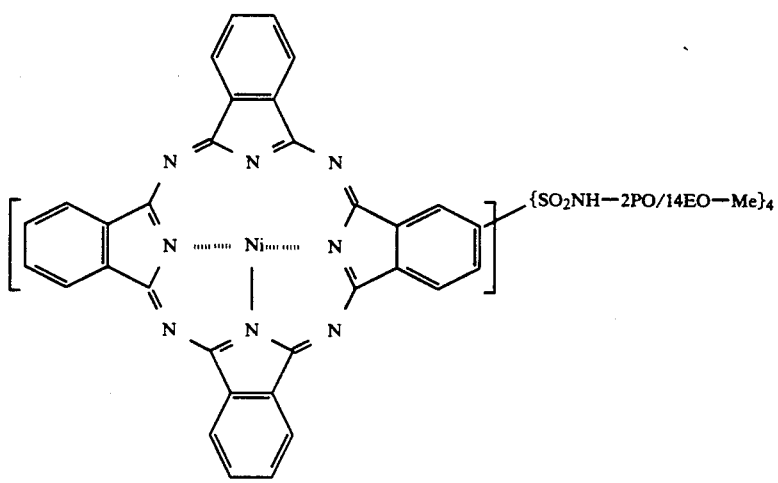

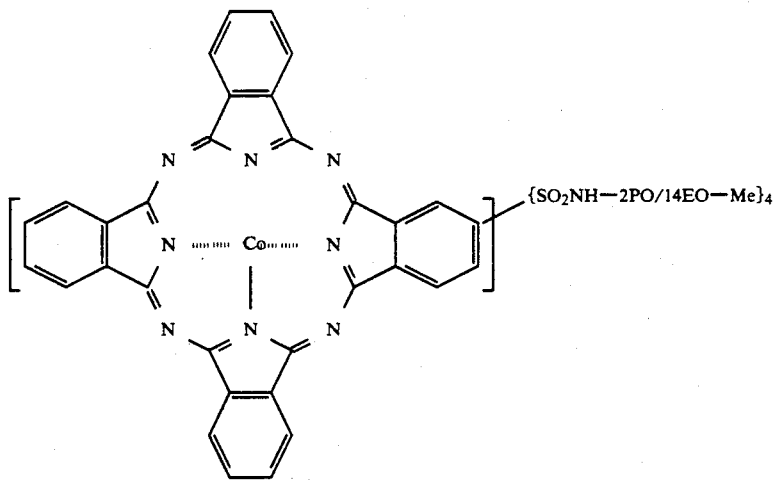

A mixture was prepared by adding 44.1 grams (0.062 moles) of a primary amine with an amine equivalent weight of 1.35 meq/g to 11.9 grams (0.11 moles) sodium carbonate in 250 ml of water. The mixture was cooled to 10°–15° C. and 0.014 moles an aqueous wet cake of freshly prepared cobalt phthalocyaninesulfonyl chloride derivative (containing an average of about 4 chlorosulfonyl groups per molecule) was added to the mixture over one and a half hours. When the addition was complete, the mixture was warmed to 50° C. to for an additional two hours to insure complete reaction. Afterwards, the mixture was cooled and the product was extracted into methylene chloride. The methylene chloride solution was separated from the salt water solution, washed several times with water to neutral pH, and dried over anhydrous magnesium sulfate. The dried methylene chloride solution was filtered and stripped under reduced pressure at 90° C. to give a blue liquid with an absorbance at 661 nm.

EXAMPLE 8

A mixture was prepared by adding 45.9 grams (0.10 moles) of a primary amine with an amine equivalent weight of 2.06 meq/g to 10.6 grams (0.10 moles) sodium carbonate in 400 ml of THF. The mixture Was cooled to 10°–15° C. and 77.8 grams (0.0315 moles) of a 33% active aqueous wet cake of freshly prepared copper phthalocyaninesulfonyl chloride derivative (containing an average of about 2 chlorosulfonyl groups per molecule) was added to the mixture over one and a half hours. When the addition was complete, the mixture was warmed to 50° C. to for an additional two hours to insure complete reaction. The aqueous THF solution was allowed to evaporate in a fume hood, 300 ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to a blue liquid with an absorbance at 667 nm.

EXAMPLE 9

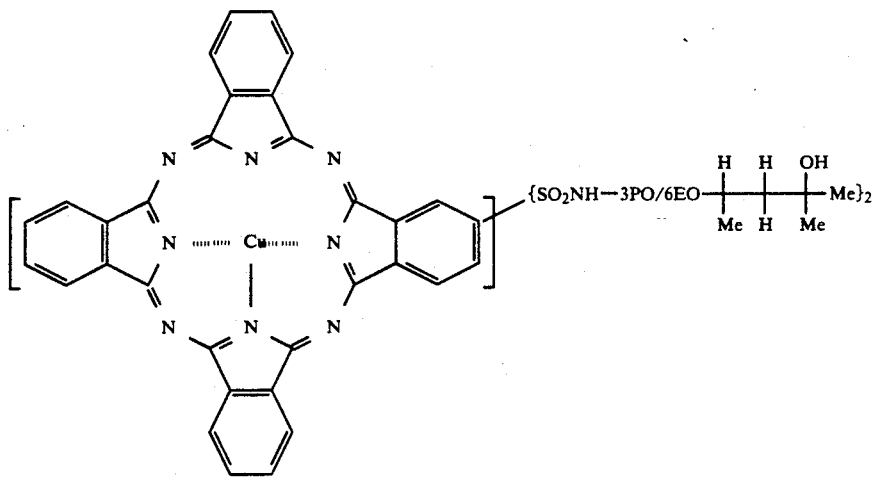

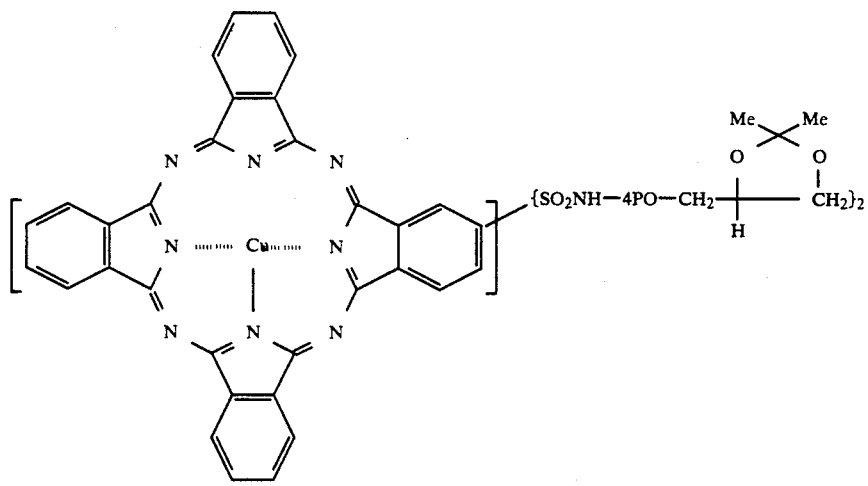

A mixture was prepared by adding 70.3 grams (0.19 moles) of a primary amine with an amine equivalent weight of 2.7 meq/g to 24.0 grams (0.23 moles) sodium carbonate in 400 ml of THF. The mixture was cooled to 10°-15° C. and 100 grams (0.061 moles) of a 50% active aqueous wet cake of freshly prepared copper phthalocyaninesulfonyl chloride derivative (containing an average of about 2 chlorosulfonyl groups per molecule) was added to the mixture over one and a half hours. After the addition was complete, the mixture was warmed to 50° C. to for an additional two hours to insure complete reaction. The aqueous THF solution was allowed to evaporate in a fume hood, 300 ml of methylene chloride was added followed by 300 ml of water. The methylene chloride solution was separated from the salt water solution, further washed several times with water to neutral pH, and dried over anhydrous magnesium sulfate. The dried solution was filtered and stripped under reduced pressure at 90° C. to a blue liquid with an absorbance at 667 nm.

EXAMPLE 10

Fifty grams (0.0302 moles) of the acetal prepared in example nine were added along with 100 ml of water to a three necked 250 ml flask equipped with overhead stirrer, heating mantle, and Dean Stark trap. The mixture was heated to 80° C. and 2 grams of 70% sulfuric acid were added. This reaction mixture was maintained at 80° C. until no more acetone could be detected overhead in the trap. The mixture was then cooled and the product was extracted into methylene chloride. The methylene chloride solution was separated, washed several times with water to neutral pH, and dried over anhydrous magnesium sulfate. The dried methylene chloride solution was filtered and stripped under reduced pressure at 90° C. to give a blue product containing a hydroxyl band in the IR spectrum and an absorbance at 667 nm.

EXAMPLE 11

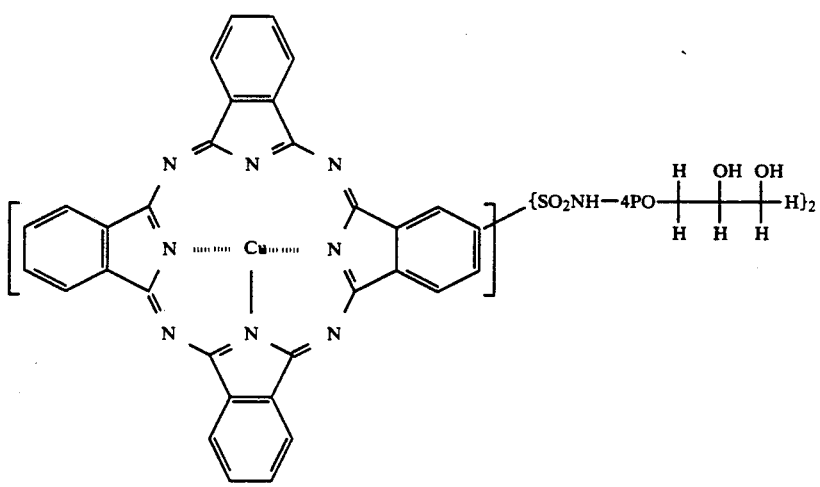

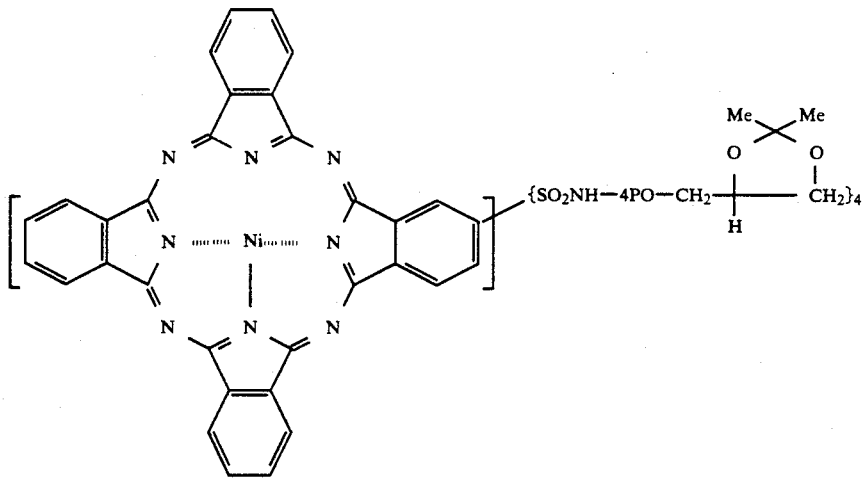

A mixture was prepared by adding 130.4 grams (0.352 moles) of a primary amine with an amine equivalent weight of 2.7 meq/g to 52.1 grams (0.081 moles) potassium carbonate in 500 ml of water. The mixture was cooled to 10°–15° C. and 0.88 moles of an aqueous wet cake of freshly prepared nickel phthalocyaninesulfonyl chloride derivative (containing an average of about 4 chlorosulfonyl groups per molecule) was added to the mixture over one-half hour. When the addition was complete, the mixture was warmed to 50° C. to for an additional two hours to insure complete reaction. Afterwards, the mixture was cooled and the product was extracted into methylene chloride. The methylene chloride solution was separated from the salt water solution, washed several times with water to neutral pH, and dried over anhydrous magnesium sulfate. The dried methylene chloride solution was filtered and stripped under reduced pressure at 90° C. to give a blue liquid with an absorbance at 662 nm.

EXAMPLE 12

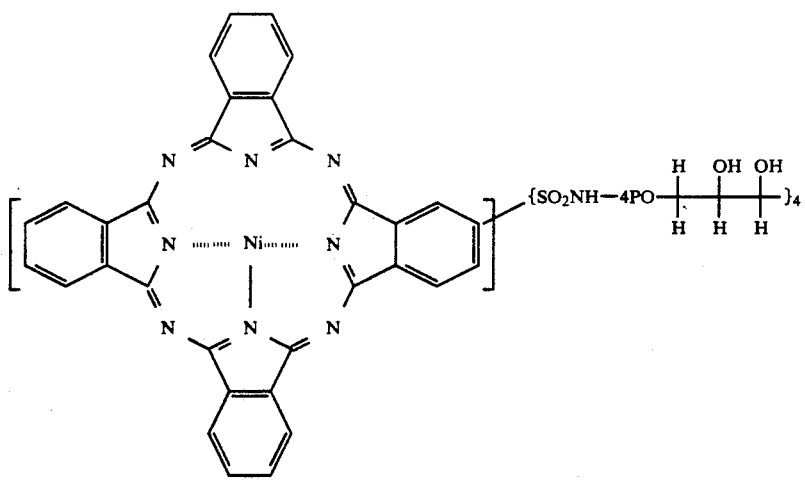

Fifty grams (0.22 moles) of the acetal prepared in example 11 were added along with 100 ml of water to a three necked 250 ml flask equipped with overhead stirrer, heating mantle, and Dean Stark trap. The mixture was heated to 80° C. and 2 grams of 70% sulfuric acid was added. This reaction mixture was maintained at 80° C. until no more acetone could be detected overhead in the trap. The mixture was then cooled and the product was extracted into methylene chloride. The methylene chloride solution was separated, washed several times with water to neutral pH, and dried over anhydrous magnesium sulfate. The dried methylene chloride solution was filtered and stripped under reduced pressure at 90° C. to give a blue product containing a hydroxyl band in the IR spectrum and an absorbance at 661 nm

EXAMPLE 13

This example demonstrates the improved heat stability of a polymeric copper phthalocyanine over copper phthalocyanine pigment The polymeric colorant of example 1 and Copper phthalocyanine blue pigment (Sun Chemical Company, 99% pure) were evaluated in the following formulations:

| INGREDIENT | Formulation A | Formulation B |
|---|---|---|
| 4MF Polypropylene resin (Exxon 9142G) | 5000 g | 5000 g |
| Irganox 1010 (Ciba-Geigy) | 5 g | 5 g |
| Irgaphos 168 (Ciba-Geigy) | 2.5 g | 2.5 g |
| Calcium stearate | 5 g | 5 g |
| Polymeric colorant (example 1) | 12.5 g | — |

| INGREDIENT | Formulation A | Formulation B |
|---|---|---|
| Copper phthalocyanine pigment | — | 5 g |

*For comparison purposes, the colorant concentrations shown were used to obtain about the same depth of shade in each formation.

The additives were mixed mechanically, melt compounded at 440° F. through a one inch extruder, and chopped into pellets. Injection molded step plaques(2×3") were prepared from each formulation. The resins were then re-extruded two more times at 575° F., and plaques were molded after each extrusion. Color changes (delta E) between the control plaques (440° F. extrusion) and the plaques after re-extrusion were measured on a Hunter Colorimeter. The results shown in the table below indicate that the pigment showed significant change in shade during high temperature extrusion, while the polymeric colorant of example one was virtually unchanged.

| FORMULATION | EXTRUSION CONDITIONS | DELTA E* |
|---|---|---|
| A | 1 × 440° F. | — |
| A | 1 × 440° F., 1 × 575° F. | 1.0 |
| A | 1 × 440° F.; 2 × 575° F. | 1.2 |
| B | 1 × 440° F. | — |
| B | 1 × 440° F., 1 × 575° F. | 6.3 |
| B | 1 × 440° F., 2 × 575° F. | 13.7 |

*CIELAB Coordinates

EXAMPLE 14

This example demonstrates the ease with which the polymeric colorants are purged from compounding equipment such as extruders. After completion of the heat stability experiments for each formulation of example 13, the extruder was purged with one poundshots of uncolored resin until the extrudate showed an insignificant amount of residual color. For formulation A (containing the polymeric colorant of example one), 3–4 pounds of purge resin were required to obtain a virtually colorless extrudate. In Contrast, for formulation B (Copper phthalocyanine pigment), blue color was still observed in the extrudate even after purging the extruder with twenty-five one pound shots of purge resin.

EXAMPLE 15

This example demonstrates the non-nucleation properties of polymeric phthalocyanine colorants of the present invention verses phthalocyanine pigment in a polyolefin resin. Formulation A(polymeric colorant of example 1) and formulation B(phthalocyanine pigment) from example 13 were analyzed by Differential Scanning Calorimetry(Perkin-Elmer Series 7 Thermal analysis System) to determine crystallization temperature. The base resin(uncolored) was also tested. The results shown in the table below indicate that the polymeric colorant has no effect on crystallization properties, while in contrast, the phthalocyanine pigment has a significant effect.

| FORMULATION | CRYSTALLIZATION TEMPERATURE(°C.)* | | |
|---|---|---|---|
| | T1 | T2 | PEAK |
| Base resin(No Colorant) | 105 | 87 | 94 |
| A (Polymeric Colorant Example #1) | 105 | 87 | 95 |
| B (Pigment) | 119 | 104 | 112 |

*Cooling Rate = 10° C./min

EXAMPLE 16

This example demonstrates the non-migration properties of the phthalocyanines of this invention. Two plaques from formulation A (surface area=25 in$^2$, 13 grams polymer, 0.0325 grams of colorant) were extracted with 500 ml of 95% ethanol at 120° F. for ten days. The colorant is soluble in this solvent. The extract was analyzed using a 1 cm path length cell on a Beckman DU-7 spectrophotometer (detection limit approximately $8 \times 10^{-6}$ grams of colorant per liter). The colorant was not detected in the extract, indicating that less than 0.012% of the colorant had migrated or been extracted from the polymer.

EXAMPLE 17

This example illustrates the use of polymeric phthalocyanine colorants in polyurethane. A polyurethane foam was prepared using the colorant of example 12 in the formulation shown below:

| | |
|---|---|
| Niax 16-56 Polyol(Union Carbide Corp.) | 100 g |
| Water | 4.8 ml |
| Dabco 33 LV(Air Products) | 0.31 ml |
| T-9 Catalyst(M&T Chemical Co.) | 0.2 ml |
| L-520 Silicone(Union Carbide Corp.) | 1.5 ml |
| Methylene Chloride | 5.4 ml |
| Toluene Diisocyanate | 55 ml |
| Colorant | 1 g |

This foam was cured for one hour at 160° F. to give an even, bright, aqua blue shade. The polymeric colorant was not extractable with methanol, indicating that the colorant had copolymerized into the polyurethane structure.

The following tables represent prophetic examples to further illustrate specific colorants of the present invention, wherein the terminating group W of Y is separated out from Y column for purposes of clarity, and wherever A is used in the tables, it designates the metallophthalocyanine specified in that example.

TABLE 1

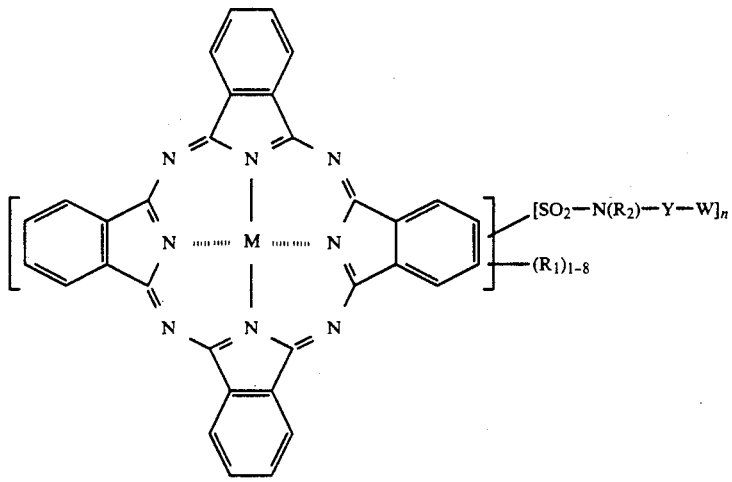

| Exam. | M | (R₁) | —N(R₂)— | n | W | Y |
|---|---|---|---|---|---|---|
| 1 | Cu | H | —NH— | 1 | n-Bu | 2BO/3EO |
| 2 | Cu | H | —NH— | 2 | Me | 2BO/3EO |
| 3 | Cu | H | —NH— | 2 | Me | 2BO/4EO |
| 4 | Ni | H | —N(C₂H₅)— | 2 | Me | 2BO/1EO |
| 5 | Ni | H | —NH— | 2 | Me | 2PO/19EO |
| 6 | Al | H | —N(C₆H₅)— | 2 | Me | 2PO/14EO |
| 7 | Al | H | —NH— | 2 | Me | 2PO/7EO |
| 8 | Cu | H | —N(C₆H₁₁)— | 2 | Me | 2PO/31EO |
| 9 | Cu | H | —NH— | 2 | Me | 31PO/3EO |
| 10 | Al | H | —NH— | 2 | n-C₆H₁₃ | 2BO/6EO |
| 11 | Cu | H | —NH— | 2 | n-C₆H₁₃ | 3BO/6EO |
| 12 | Cu | H | —N(CH₂C₆H₅)— | 2 | n-C₆H₁₃ | 2PO/8EO |
| 13 | Cu | H | —NH— | 2 | n-C₆H₁₃ | 5PO/3EO |
| 14 | Mn | H | —NH— | 2 | n-C₆H₁₃ | 3PO/6EO |
| 15 | Cu | H | —NH— | 2 | n-C₆H₁₃ | 3PO/4EO |
| 16 | Cu | H | —NH— | 2 | n-C₆H₁₃ | 4PO/5EO |
| 17 | Fe | H | —NH— | 2 | n-C₆H₁₃ | 4PO/5EO |
| 18 | Cu | H | —NH— | 2 | n-C₆H₁₃ | 6PO/6EO |
| 19 | Cu | H | —NH— | 2 | n-C₁₀H₂₁ | 2PO |
| 20 | Cu | H | —NH— | 2 | Me | 9PO/1EO |
| 21 | Cu | H | —N(CH₃)— | 2 | Me | 7EO |
| 22 | Cu | H | —N(CH₃)— | 2 | Me | 12EO |
| 23 | Cr | H | —N(CH₃)— | 2 | Me | 16EO |
| 24 | Cu | H | —NH— | 2 | C₆H₅ | 2PO/4EO |
| 25 | Cu | H | —NH— | 2 | C₆H₅ | 2PO/10EO |
| 26 | Cu | H | —NH— | 2 | p(n-Bu)C₆H₄ | 2PO/4EO |
| 27 | Cr | H | —NH— | 2 | p(n-Bu)C₆H₄ | 2PO/11EO |
| 28 | Cu | H | —NH— | 2 | p(n-Bu)C₆H₄ | 2PO/10EO |
| 29 | Cu | H | —NH— | 4 | Me | 3BO/3EO |
| 30 | Cu | H | —NH— | 4 | n-C₆H₁₃ | 3BO/6EO |
| 31 | Cu | H | —NH— | 4 | n-C₆H₁₃ | 3PO/4EO |
| 32 | Cu | H | —NH— | 4 | Me | 2PO/19EO |
| 33 | Cu | H | —NH— | 4 | Me | 2PO/10EO |
| 34 | Cu | H | —NH— | 4 | Me | 2PO/7EO |
| 35 | Cu | H | —NH— | 4 | n-Bu | 2BO/3EO |
| 36 | Cu | H | —NH— | 4 | n-Bu | 2BO/4EO |
| 37 | Cu | H | —NH— | 4 | C₆H₅ | 2PO/4EO |
| 38 | Cu | H | —NH— | 4 | C₆H₅ | 2PO/11EO |
| 39 | Cu | H | —NH(CH₃)— | 4 | Me | 7EO |
| 40 | Cu | H | —NH— | 3 | Me | 2BO/4EO |
| 41 | Cu | H | —NH— | 3 | n-C₆H₁₃ | 2BO/6EO |
| 42 | Cu | H | —NH— | 3 | n-C₆H₁₃ | 5PO/3EO |
| 43 | Cu | tetra-O-t-C₄H₉ | —NH— | 3 | n-Bu | 2BO/4EO |
| 44 | Cu | tetra-O-n-C₄H₉ | —NH— | 3 | Me | 2PO/4EO |
| 45 | Cu | Cl | —NH— | 2 | n-Bu | 2BO/4EO |
| 46 | Cu | di-Cl | —NH— | 2 | n-Bu | 2BO/4EO |
| 47 | Cu | tri-Cl | —NH— | 2 | Me | 2PO/7EO |
| 48 | Cu | tetra-Cl | —NH— | 2 | n-C₆H₁₃ | 6BO/6EO |
| 49 | Cu | Br | —NH— | 2 | n-Bu | 2BO/3EO |
| 50 | Cu | di-Br | —NH— | 2 | Me | 2PO/10EO |
| 51 | Cu | tetra-Br | —NH— | 2 | n-C₆H₁₃ | 3PO/4EO |
| 52 | Cu | Me | —NH— | 2 | C₆H₅ | 2PO/4EO |
| 53 | Cu | di-Me | —NH— | 2 | Me | 2PO/7EO |
| 54 | Cu | tetra-C₆H₅ | —NH— | 2 | Me | 2PO/10EO |
| 55 | Cu | tetra-C₆H₅ | —NH— | 4 | n-Bu | 2BO/3EO |
| 56 | Cu | tetra-C₆H₅ | —NH— | 3 | n-C₆H₁₃ | 6BO/6EO |
| 57 | Cu | OMe | —NH— | 2 | n-Bu | 2BO/3EO |

TABLE 1-continued

| | | | | | | |
|---|---|---|---|---|---|---|
| 58 | Cu | di-OMe | —NH— | 4 | Me | 2BO/3EO |
| 59 | Cu | tetra-OMe | —NH— | 4 | Me | 2BO/4EO |
| 60 | Cu | O—C$_6$H$_5$ | —NH— | 2 | n-C$_6$H$_{13}$ | 2BO/6EO |
| 61 | Cu | di-(OC$_6$H$_5$) | —NH— | 2 | n-C$_6$H$_{13}$ | 5PO/3EO |
| 62 | Cu | tetra-(OC$_6$H$_5$) | —NH— | 2 | n-Bu | 2BO/4EO |
| 63 | Cu | di-(SC$_6$H$_5$) | —NH— | 2 | Me | 2PO/14EO |
| 64 | Cu | tetra-(SC$_6$H$_5$) | —NH— | 2 | Me | 2PO/14EO |
| 65 | Cu | I | —NH— | 2 | C$_6$H$_5$ | 2PO/4EO |
| 66 | Cu | di-I | —NH— | 2 | n-Bu | 2BO/3EO |
| 67 | Cu | tetra-I | —NH— | 4 | n-Bu | 2BO/4EO |
| 68 | Cu | —NH$_2$ | —NH— | 4 | Me | 2BO/1EO |
| 69 | Cu | di-NH$_2$ | —NH— | 2 | Me | 2PO/10EO |
| 70 | Cu | tetra-NH$_2$ | —NH— | 4 | n-Bu | 2PO/3EO |
| 71 | Cu | NHCOMe | —NH— | 4 | n-C$_6$H$_{13}$ | 3PO/4EO |
| 72 | Cu | di-NHCOMe | —NH— | 4 | C$_6$H$_5$ | 2PO/4EO |
| 73 | Cu | tetra-NHCOMe | —NH— | 4 | n-C$_6$H$_{13}$ | 3PO/4EO |
| 74 | Cu | H | —N(CH$_3$)— | 2 | Me | 2BO/4EO |
| 75 | Cu | H | —N(C$_2$H$_5$)— | 2 | Me | 3BO/4EO |
| 76 | Cu | H | —N(CH$_2$C$_6$H$_5$)— | 2 | n-C$_6$H$_{13}$ | 2PO/7EO |
| 77 | Cu | H | —N(iso-C$_3$H$_7$)— | 2 | n-Bu | 2PO/7EO |
| 78 | Cu | H | —N[(5EO)-C$_6$H$_{13}$]— | 2 | Me | 2BO/4EO |
| 79 | Cu | H | —N[(1EO/4PO)-Me]— | 2 | nC$_6$H$_{13}$ | 2BO/6EO |
| 80 | Cu | H | —N[(3PO)-C$_6$H$_{13}$]— | 2 | n-C$_6$H$_{13}$ | 2PO/8EO |
| 81 | Cu | H | —N(CH$_2$C$_6$H$_{13}$)— | 2 | n-Bu | 2BO/6EO |
| 82 | Cu | H | —N(iso-C$_4$H$_9$)— | 2 | Me | 2PO/7EO |
| 83 | Cu | H | —N(C$_6$H$_{11}$)— | 2 | n-Bu | 2PO/7EO |
| 84 | Cu | H | —N(C$_6$H$_5$)— | 2 | n-Bu | 2PO/4EO |
| 85 | Cu | H | —NH— | 2 | H | 10EO |
| 86 | Cu | H | —NH— | 2 | H | 3EO/5PO |
| 87 | Cu | H | —NH— | 2 | H | 3O/10PO |
| 88 | Ni | H | —NH— | 2 | n-Bu | 2BO/4EO |
| 89 | Ni | H | —NH— | 3 | n-Bu | 2PO/3EO |
| 90 | Ni | H | —NH— | 4 | Me | 2BO/3EO |
| 91 | Ni | Cl | —NH— | 2 | n-C$_6$H$_{13}$ | 6PO/6EO |
| 92 | Ni | di-Cl | —NH— | 2 | Me | 2PO/7EO |
| 93 | Ni | Br | —NH— | 2 | C$_6$H$_5$ | 2PO/4EO |
| 94 | Ni | Me | —NH— | 4 | Me | 2BO/3EO |
| 95 | Ni | di-OMe | —NH— | 2 | Me | 2PO/7EO |
| 96 | Ni | di-(OC$_6$H$_5$) | —NH— | 2 | Me | 2PO/7EO |
| 97 | Ni | tetra-(OC$_6$H$_5$) | —NH— | 4 | n-Bu | 2BO/4EO |
| 98 | Ni | tetra-(SC$_6$H$_5$) | —NH— | 4 | n-Bu | 2BO/3EO |
| 99 | Co | H | —NH— | 2 | Me | 2PO/14EO |
| 100 | Co | H | —NH— | 4 | n-Bu | 2BO/3EO |
| 101 | Co | di-OMe | —NH— | 2 | Me | 2PO/7EO |
| 102 | Co | di-(OC$_6$H$_5$) | —NH— | 2 | Me | 2PO/7EO |
| 103 | Co | tetra-(OC$_6$H$_5$) | —NH— | 4 | n-Bu | 2BO/4EO |
| 104 | Co | tetra-(SC$_6$H$_5$) | —NH— | 4 | n-Bu | 3BO/4EO |

TABLE 2

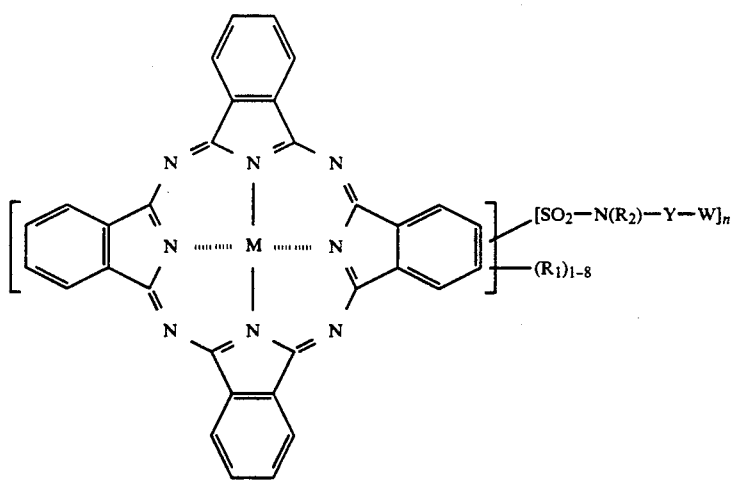

| Example | M | (R1) | —N(R2)— | n | W | Y |
|---|---|---|---|---|---|---|
| 1 | Cu | H | —NH— | 1 | —CH$_2$CH(CH$_3$)—NH$_2$ | 5PO |
| 2 | Al | tetra-CH$_3$ | —NH— | 2 | —CH$_2$CH(CH$_3$)—N(CH$_3$)$_2$ | 5PO/3EO |
| 3 | Ni | tetra-Cl | —NH— | 3 | —CH$_2$CH(CH$_3$)—SO$_2$NH-A | 5PO-(CH$_2$)$_6$—O-5PO |
| 4 | Ni | di-OCOCH$_3$ | —NH— | 3 | —CH$_2$CH(CH$_3$)—NHC$_6$H$_5$ | 2BO-C$_6$H$_4$—O-3PO |
| 5 | Cu | tetra-CH$_3$ | —NH— | 4 | —CH$_2$CH(CH$_3$)—NHC$_6$H$_4$-p-Me | 5PO-O—(CH$_2$)$_6$—O-5PO |
| 6 | Fe | di-OC$_2$H$_5$ | —NH— | 4 | —C$_2$H$_4$—O—C$_6$H$_4$-p-NH$_2$ | (3PO)-NH-(14EO) |

TABLE 2-continued

| | | | | | | | |
|---|---|---|---|---|---|---|---|
| 7 | Cr | di-NHSO$_2$CH$_3$ | —NH— | 4 | —C$_2$H$_4$—O—C$_2$H$_4$—N(Me)$_2$ | (5PO)-N(CH$_3$)-(10PO) |
| 8 | Mn | tetra-N(Me)$_2$ | —NH— | 2 | —CH$_2$CH(OH)CH$_3$ | (5PO)-N(C$_6$H$_{11}$)-10PO |
| 9 | Cu | NHCOCH$_3$ | —NH— | 2 | —C$_2$H$_4$OCH$_3$ | (10PO)-N(C$_6$H$_5$)-(10EO) |
| 10 | Cu | di-OCOCH$_3$ | —NH— | 2 | —CH$_2$OCOCH$_3$ | (3PO)-N[(10PO)Et]-(10PO) |
| 11 | Cu | H | —NH— | 2 | —C$_2$H$_4$C$_6$H$_5$ | (3PO)-N—(SO$_2$A)-10EO) |
| 12 | Al | H | —NH— | 1 | —C$_2$H$_4$—O—C$_6$H$_5$ | (2PO)-NHCONH-(3EO) |
| 13 | Al | H | —NH— | 1 | —C$_2$H$_4$—NHCONH$_2$ | 3PO/6EO |
| 14 | Al | tetra-C$_2$H$_5$ | —NH— | 1 | —C$_2$H$_4$—NHCON(CH$_3$)$_2$ | 9PO/1EO |
| 15 | Fe | tetra-Br | —NH— | 1 | —C$_2$H$_4$—N(CH$_3$)$_2$ | 20EO |
| 16 | Fe | tetra-C$_6$H$_5$ | —NH— | 1 | —H | 10EO |
| 17 | Fe | tetra-I | —NH— | 4 | —CH$_2$CH$_2$CH$_3$ | 4PO |
| 18 | Ni | tetra-NH$_2$ | —NH— | 4 | —C$_2$H$_4$—C$_6$H$_{11}$ | 2PO/14EO |
| 19 | Ni | tetra-NHCOMe | —NH— | 2 | —C$_2$H$_4$OCOCH$_3$ | 4PO |
| 20 | Cu | H | —NH— | 2 | —C$_6$H$_5$ | 3PO/6EO |
| 21 | Cu | H | —NH— | 4 | —CH$_2$CH(OH)CH$_2$OH | 4PO |
| 22 | Cu | H | —NH— | 2 | —COC$_6$H$_5$ | 3PO/6EO |
| 23 | Cu | H | —NH— | 2 | —COC$_6$H$_{11}$ | 10EO |
| 24 | Cu | H | —NH— | 2 | —CO$_2$C$_2$H$_5$ | 4PO |
| 25 | Cu | H | —NH— | 1 | —CON(CH$_3$)$_2$ | 3PO/6EO |
| 26 | Cu | H | —NH— | 2 | —CONHC$_6$H$_5$ | 5PO |
| 27 | Cu | H | —NH— | 2 | —CH$_2$CH$_2$COCH$_3$ | 20EO |
| 28 | Cu | H | —NH— | 3 | —Cl | 10PO/5EO |
| 29 | Cu | H | —NH— | 2 | —SH | 10EO/5PO |
| 30 | Cu | H | —NH— | 2 | —SC$_2$H$_5$ | 5EO/15PO/5EO |
| 31 | Cu | H | —NH— | 2 | —SC$_6$H$_5$ | 15PO/5EO |

TABLE 3

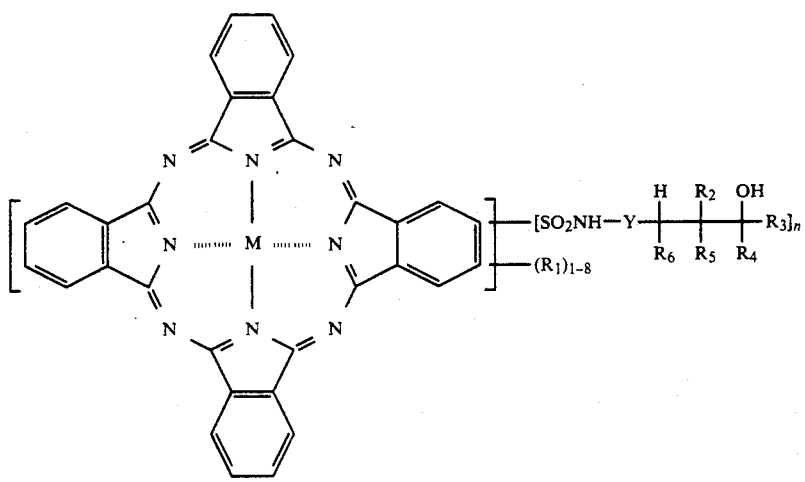

| Exam. | M | n | (R$_1$) | R$_2$ | R$_3$ | R$_4$ | R$_5$ | R$_6$ | Y |
|---|---|---|---|---|---|---|---|---|---|
| 1 | Cu | 2 | H | OH | H | H | H | H | 3PO/1EO |
| 2 | Cu | 2 | H | OH | H | H | H | H | 3PO |
| 3 | Cu | 2 | H | OH | H | H | H | H | 4PO |
| 4 | Ni | 2 | H | OH | H | H | H | H | 8PO/8EO |
| 5 | Ni | 2 | H | OH | H | H | H | H | 5PO/3EO |
| 6 | Cu | 2 | H | OH | H | H | H | H | 4PO/3EO |
| 7 | Cu | 2 | H | OH | H | H | H | H | 2PO/19EO |
| 8 | Al | 2 | H | OH | H | H | H | H | 2PO/14EO |
| 9 | Al | 2 | H | OH | H | H | H | H | 2PO/7EO |
| 10 | Cu | 2 | H | OH | H | H | H | H | 4PO/2EO |
| 11 | Cu | 2 | H | OH | H | H | H | H | 8PO/2EO |
| 12 | Mn | 2 | H | OH | H | H | H | H | 2BO/3EO |
| 13 | Cu | 2 | H | OH | H | H | H | H | 2BO/4EO |
| 14 | Fe | 2 | H | OH | H | H | H | H | 2BO/1EO |
| 15 | Cu | 2 | H | OH | H | H | Me | H | 4PO |
| 16 | Fe | 2 | H | OH | H | H | Me | H | 4PO/4EO |
| 17 | Cu | 2 | H | OH | H | H | Me | H | 8PO/8EO |
| 18 | Cu | 2 | H | OH | H | H | Me | H | 2/4EO |
| 19 | Cu | 2 | H | OH | H | H | Me | H | 2PO/7EO |
| 20 | Cu | 2 | H | OH | H | H | Et | H | 31PO/3EO |
| 21 | Cu | 2 | H | OH | H | H | Et | H | 3PO |
| 22 | Cu | 2 | H | OH | H | H | Et | H | 4PO/2EO |
| 23 | Cu | 2 | H | OH | H | H | Et | H | 3BO/6EO |
| 24 | Cr | 4 | H | OH | H | H | H | H | 4PO |
| 25 | Cu | 4 | H | OH | H | H | H | H | 2BO/4EO |
| 26 | Cu | 4 | H | OH | H | H | H | H | 5PO/3EO |
| 27 | Cu | 4 | H | OH | H | H | H | H | 3PO |
| 28 | Cu | 4 | H | OH | H | H | Me | H | 3PO/1EO |

TABLE 3-continued

| | | | | | | | | | |
|---|---|---|---|---|---|---|---|---|---|
| 29 | Cr | 4 | H | OH | H | H | Et | H | 3PO |
| 30 | Cu | 4 | H | OH | H | H | Et | H | 3PO/6EO |
| 31 | Cu | 3 | H | OH | H | H | H | H | 2BO/4EO |
| 32 | Cu | 3 | H | OH | H | H | H | H | 8BO/8EO |
| 33 | Cu | 3 | H | OH | H | H | H | H | 4PO/3EO |
| 34 | Cu | 3 | H | OH | H | H | Me | H | 2PO/7EO |
| 35 | Cu | 2 | Cl | OH | H | H | H | H | 3BO/6EO |
| 36 | Cu | 2 | di-Cl | OH | H | H | H | H | 2PO/4EO |
| 37 | Cu | 2 | tetra-Cl | OH | H | H | H | H | 6PO/6EO |
| 38 | Cu | 2 | Br | OH | H | H | H | H | 2BO/3EO |
| 39 | Cu | 2 | tetra-Br | OH | H | H | H | H | 5PO/3EO |
| 40 | Cu | 2 | di-$C_6H_5$ | OH | H | H | H | H | 8PO/8EO |
| 41 | Cu | 2 | tetra-$C_6H_5$ | OH | H | H | H | H | 8PO/2EO |
| 42 | Cu | 2 | OMe | OH | H | H | H | H | 4PO |
| 43 | Cu | 4 | di-OMe | OH | H | H | H | H | 4PO/2EO |
| 44 | Cu | 4 | tetra-OMe | OH | H | H | H | H | 2BO/4EO |
| 45 | Cu | 2 | $OC_6H_5$ | OH | H | H | H | H | 3PO/6EO |
| 46 | Cu | 2 | di-($OC_6H_5$) | OH | H | H | H | H | 5PO/3EO |
| 47 | Cu | 2 | tetra-($OC_6H_5$) | OH | H | H | H | H | 8PO/2EO |
| 48 | Cu | 2 | di-($SC_6H_5$) | OH | H | H | H | H | 2PO/7EO |
| 49 | Cu | 2 | tetra-($SC_6H_5$) | OH | H | H | H | H | 8PO/8EO |
| 50 | Cu | 2 | I | OH | H | H | H | H | 2PO/14EO |
| 51 | Cu | 4 | di-I | OH | H | H | H | H | 2PO/14EO |
| 52 | Cu | 4 | tetra-I | OH | H | H | H | H | 4PO |
| 53 | Cu | 2 | —$NH_2$ | OH | H | H | H | H | 4PO/4EO |
| 54 | Cu | 4 | di-$NH_2$ | OH | H | H | H | H | 2BO/4EO |
| 55 | Cu | 4 | tetra-$NH_2$ | OH | H | H | H | H | 2BO/4EO |
| 56 | Cu | 4 | NHCOMe | OH | H | H | H | H | 3PO/1EO |
| 57 | Cu | 4 | di-NHCOMe | OH | H | H | H | H | 4PO/4EO |
| 58 | Cu | 4 | tetra-NHCOMe | OH | H | H | H | H | 2BO/4EO |
| 59 | Ni | 2 | H | OH | H | H | H | H | 6PO/7EO |
| 60 | Ni | 2 | H | OH | H | H | H | H | 6PO/7EO |
| 61 | Ni | 2 | H | OH | H | H | Me | H | 4PO |
| 62 | Ni | 2 | H | OH | H | H | Et | H | 3BO |
| 63 | Ni | 4 | H | OH | H | H | H | H | 3PO/3EO |
| 64 | Ni | 4 | Cl | OH | H | H | H | H | 6PO/6EO |
| 65 | Ni | 2 | di-Cl | OH | H | H | H | H | 2PO/10EO |
| 66 | Ni | 2 | tetra-Cl | OH | H | H | H | H | 5PO/3EO |
| 67 | Ni | 2 | Me | OH | H | H | H | H | 2BO/4EO |
| 68 | Ni | 2 | di-Me | OH | H | H | H | H | 4PO |
| 69 | Ni | 2 | di-OMe | OH | H | H | H | H | 4PO/3EO |
| 70 | Ni | 2 | di-($OC_6H_5$) | OH | H | H | H | H | 4PO/3EO |
| 71 | Ni | 4 | tetra-($OC_6H_5$) | OH | H | H | H | H | 2BO/3EO |
| 72 | Ni | 4 | tetra-($SC_6H_5$) | OH | H | H | Me | H | 2BO/3EO |
| 73 | Co | 4 | H | OH | H | H | H | H | 4PO |
| 74 | Co | 4 | H | OH | H | H | Et | H | 3PO |
| 75 | Co | 4 | H | OH | H | H | Et | H | 3PO |
| 76 | Co | 2 | di-OMe | OH | H | H | H | H | 4PO/3EO |
| 77 | Co | 2 | di-($OC_6H_5$) | OH | H | H | H | H | 8PO/2EO |
| 78 | Co | 4 | tetra-($OC_6H_5$) | OH | H | H | H | H | 2PO/4EO |
| 79 | Co | 4 | tetra-($SC_6H_5$) | OH | H | H | H | H | 3PO/1EO |
| 80 | Cu | 2 | H | Me | Me | H | H | Me | 2PO/8EO |
| 81 | Cu | 2 | H | Me | Me | H | H | Me | 5PO/3EO |
| 82 | Cu | 2 | H | Me | Me | H | H | Me | 3PO/4EO |
| 83 | Cu | 2 | H | Me | Me | H | H | Me | 4PO/3EO |
| 84 | Cu | 2 | H | Me | Me | H | H | Me | 6PO/6EO |
| 85 | Cu | 2 | H | Me | Me | H | H | Me | 3BO/6EO |
| 86 | Cu | 2 | H | Me | Me | H | H | Me | 3BO/3EO |
| 87 | Cu | 2 | H | Me | Me | H | H | Me | 2BO/3EO |
| 88 | Cu | 4 | H | Me | Me | H | H | Me | 3PO/6EO |
| 89 | Cu | 4 | H | Me | Me | H | H | Me | 4PO |
| 90 | Cu | 4 | H | Me | Me | H | H | Me | 3BO |
| 91 | Cu | 4 | H | Me | Me | H | H | Me | 2PO/4EO |
| 92 | Cu | 2 | Cl | Me | Me | H | H | Me | 2PO/14EO |
| 93 | Cu | 2 | di-Cl | Me | Me | H | H | Me | 8PO/8EO |
| 94 | Cu | 2 | tetra-Cl | Me | Me | H | H | Me | 4PO/4EO |
| 95 | Cu | 2 | Br | Me | Me | H | H | Me | 5PO/3EO |
| 96 | Cu | 2 | tetra-Br | Me | Me | H | H | Me | 3PO/4EO |
| 97 | Cu | 2 | di-$C_6H_5$ | Me | Me | H | H | Me | 2PO/8EO |
| 98 | Cu | 4 | tetra-$C_6H_5$ | Me | Me | H | H | Me | 3BO/6EO |
| 99 | Cu | 2 | OMe | Me | Me | H | H | Me | 8PO/8EO |
| 100 | Cu | 4 | di-OMe | Me | Me | H | H | Me | 3BO/3EO |
| 101 | Cu | 4 | tetra-OMe | Me | Me | H | H | Me | 3BO |
| 102 | Cu | 2 | $OC_6H_5$ | Me | Me | H | H | Me | 6PO/6EO |
| 103 | Cu | 2 | di-($OC_6H_5$) | Me | Me | H | H | Me | 2PO/14EO |
| 104 | Cu | 2 | tetra-($OC_6H_5$) | Me | Me | H | H | Me | 4PO/3EO |
| 105 | Cu | 2 | di-($SC_6H_5$) | Me | Me | H | H | Me | 4PO/3EO |
| 106 | Cu | 2 | tetra-($SC_6H_5$) | Me | Me | H | H | Me | 2PO/8EO |
| 107 | Cu | 2 | I | Me | Me | H | H | Me | 5PO/3EO |
| 108 | Cu | 4 | di-I | Me | Me | H | H | Me | 2BO/3EO |
| 109 | Cu | 4 | tetra-I | Me | Me | H | H | Me | 3BO/3EO |
| 110 | Cu | 2 | —$NH_2$ | Me | Me | H | H | Me | 6PO/6EO |

TABLE 3-continued

| | | | | | | | | | |
|---|---|---|---|---|---|---|---|---|---|
| 111 | Cu | 4 | di-$NH_2$ | Me | Me | H | H | Me | 3BO/1EO |
| 112 | Cu | 4 | tetra-$NH_2$ | Me | Me | H | H | Me | 2BO/4EO |
| 113 | Cu | 4 | NHCOMe | Me | Me | H | H | Me | 4PO/4EO |
| 114 | Cu | 4 | di-NHCOMe | Me | Me | H | H | Me | 2PO/4EO |
| 115 | Cu | 4 | tetra-NHCOMe | Me | Me | H | H | Me | 2PO/4EO |
| 116 | Ni | 2 | H | Me | Me | H | H | Me | 4PO/3EO |
| 117 | Ni | 2 | H | Me | Me | H | H | Me | 5PO/3EO |
| 118 | Ni | 2 | H | Me | Me | H | H | Me | 4PO |
| 119 | Ni | 2 | H | Me | Me | H | H | Me | 8PO/8EO |
| 120 | Ni | 4 | H | Me | Me | H | H | Me | 2PO/6EO |
| 121 | Ni | 4 | Cl | Me | Me | H | H | Me | 3PO/4EO |
| 122 | Ni | 2 | di-Cl | Me | Me | H | H | Me | 2PO/14EO |
| 123 | Ni | 2 | tetra-Cl | Me | Me | H | H | Me | 4PO/3EO |
| 124 | Ni | 2 | Me | Me | Me | H | H | Me | 3BO/6EO |
| 125 | Ni | 2 | di-Me | Me | Me | H | H | Me | 8PO/8EO |
| 126 | Ni | 2 | di-OMe | Me | Me | H | H | Me | 2PO/8EO |
| 127 | Ni | 2 | di-($OC_6H_5$) | Me | Me | H | H | Me | 6PO/6EO |
| 128 | Ni | 4 | tetra-($OC_6H_5$) | Me | Me | H | H | Me | 3BO |
| 129 | Ni | 4 | tetra-($SC_6H_5$) | Me | Me | H | H | Me | 3BO/3EO |
| 130 | Co | 4 | H | Me | Me | H | H | Me | 4PO |
| 131 | Co | 4 | H | Me | Me | H | H | Me | 3PO |
| 132 | Co | 4 | H | Me | Me | H | H | Me | 2BO/4EO |
| 133 | Co | 2 | di-OMe | Me | Me | H | H | Me | 8PO/8EO |
| 134 | Co | 2 | di-($OC_6H_5$) | Me | Me | H | H | Me | 5PO/3EO |
| 135 | Co | 4 | tetra-($OC_6H_5$) | Me | Me | H | H | Me | 2BO/3EO |
| 136 | Co | 4 | tetra-($SC_6H_5$) | Me | Me | H | H | Me | 2BO/4EO |

TABLE 4

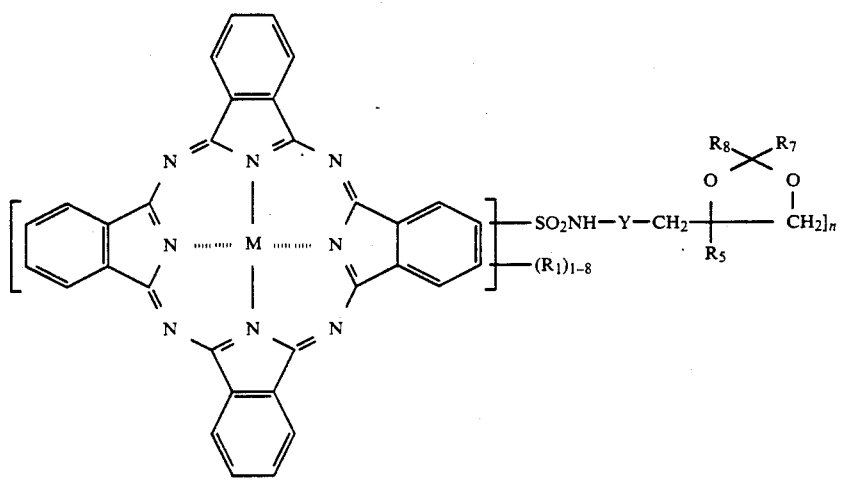

| Example | M | n | ($R_1$) | $R_5$ | $R_7$ | $R_8$ | Y |
|---|---|---|---|---|---|---|---|
| 1 | Cu | 1 | H | H | Me | Me | 3PO/1EO |
| 2 | Cu | 2 | H | H | Me | Me | 3PO |
| 3 | Cu | 2 | H | H | Me | Me | 4PO |
| 4 | Ni | 2 | H | H | Me | Me | 8PO/8EO |
| 5 | Cu | 2 | H | H | Me | Me | 5PO/3EO |
| 6 | Fe | 2 | H | H | Me | Me | 4PO/3EO |
| 7 | Cu | 2 | H | H | Me | Me | 2PO/19EO |
| 8 | Cu | 2 | H | H | Me | Me | 2PO/14EO |
| 9 | Al | 2 | H | H | Me | Me | 2PO/7EO |
| 10 | Cu | 2 | H | H | Me | Me | 4PO/2EO |
| 11 | Cu | 2 | H | H | Me | Me | 8PO/2EO |
| 12 | Mn | 2 | H | H | Me | Me | 2BO/3EO |
| 13 | Cu | 2 | H | H | Me | Me | 2BO/4EO |
| 14 | Cu | 2 | H | H | Me | Me | 2BO/1EO |
| 15 | Cu | 2 | H | Me | Me | Me | 4PO |
| 16 | Cu | 2 | H | Me | Me | Me | 4PO/4EO |
| 17 | Cu | 2 | H | Me | Me | Me | 8PO/8EO |
| 18 | Al | 2 | H | Me | Me | Me | 2PO/4EO |
| 19 | Cu | 2 | H | Me | Me | Me | 2PO/7EO |
| 20 | Cu | 2 | H | Et | Me | Me | 31PO/3EO |
| 21 | Cu | 2 | H | Et | Me | Me | 3PO |
| 22 | Cr | 2 | H | Et | Me | Me | 4PO/2EO |
| 23 | Cu | 2 | H | Et | Me | Me | 3BO/6EO |
| 24 | Cu | 4 | H | H | Me | Me | 4PO |
| 25 | Cu | 4 | H | H | Me | Me | 2BO/4EO |
| 26 | Cu | 4 | H | H | Me | Me | 5PO/3EO |
| 27 | Cu | 4 | H | H | Me | Me | 3PO |

TABLE 4-continued

| | | | | | | | |
|---|---|---|---|---|---|---|---|
| 28 | Cr | 4 | H | Me | Me | Me | 3PO/1EO |
| 29 | Cu | 4 | H | Et | Me | Me | 3PO |
| 30 | Cu | 4 | H | Et | Me | Me | 3PO/6EO |
| 31 | Cu | 3 | H | H | Me | Me | 2BO/4EO |
| 32 | Cu | 3 | H | H | Me | Me | 8BO/8EO |
| 33 | Cu | 3 | H | H | Me | Me | 4PO/3EO |
| 34 | Cu | 3 | H | Me | Me | Me | 2PO/7EO |
| 35 | Cu | 2 | Cl | H | Me | Me | 3BO/6EO |
| 36 | Cu | 2 | di-Cl | H | Me | Me | 2PO/4EO |
| 37 | Cu | 2 | tetra-Cl | H | H | H | 6PO/6EO |
| 38 | Cu | 2 | Br | H | Me | Me | 2BO/3EO |
| 39 | Cu | 2 | tetra-Br | H | Me | Me | 5PO/3EO |
| 40 | Cu | 2 | di-$C_6H_5$ | H | Me | Me | 8PO/8EO |
| 41 | Cu | 2 | tetra-$C_6H_5$ | H | Me | Me | 8PO/2EO |
| 42 | Cu | 2 | OMe | H | Me | Me | 4PO |
| 43 | Cu | 4 | di-OMe | H | Me | Me | 2PO/2EO |
| 44 | Cu | 4 | tetra-OMe | H | Me | Me | 2BO/4EO |
| 45 | Cu | 2 | $OC_6H_5$ | H | Me | Me | 3PO/6EO |
| 46 | Cu | 2 | di-($OC_6H_5$) | H | Me | Me | 5PO/3EO |
| 47 | Cu | 2 | tetra-($OC_6H_5$) | H | Me | Me | 8PO/2EO |
| 48 | Cu | 2 | di-($SC_6H_5$) | H | Me | Me | 2PO/7EO |
| 49 | Cu | 2 | tetra-($SC_6H_5$) | H | Me | Me | 8PO/8EO |
| 50 | Cu | 2 | I | H | Me | Me | 2PO/14EO |
| 51 | Cu | 4 | di-I | H | Me | Me | 2PO/14EO |
| 52 | Cu | 4 | tetra-I | H | Me | Me | 4PO |
| 53 | Cu | 2 | —$NH_2$ | H | Me | Me | 4PO/4EO |
| 54 | Cu | 4 | di-$NH_2$ | H | Me | Me | 2BO/4EO |
| 55 | Cu | 4 | tetra-$NH_2$ | H | Me | Me | 2BO/4EO |
| 56 | Cu | 4 | NHCOMe | H | Me | Me | 3PO/1EO |
| 57 | Cu | 4 | di-NHCOMe | H | Me | Me | 2PO/4EO |
| 58 | Cu | 4 | tetra-NHCOMe | H | Me | Me | 2BO/4EO |
| 59 | Ni | 2 | H | H | Me | Me | 6PO/7EO |
| 60 | Ni | 2 | H | H | Me | Me | 6PO/7EO |
| 61 | Ni | 2 | H | H | Me | Me | 4PO |
| 62 | Ni | 2 | H | Et | Me | Me | 3BO |
| 63 | Ni | 4 | H | H | Me | Me | 3PO/3EO |
| 64 | Ni | 4 | Cl | H | Me | Me | 6PO/6EO |
| 65 | Ni | 2 | di-Cl | H | Me | Me | 2PO/10EO |
| 66 | Ni | 2 | tetra-Cl | H | Me | Me | 5PO/3EO |
| 67 | Ni | 2 | Me | H | Me | Me | 2BO/4EO |
| 68 | Ni | 2 | di-Me | H | Me | Me | 4PO |
| 69 | Ni | 2 | di-OMe | H | Me | Me | 4PO/3EO |
| 70 | Ni | 2 | di-($OC_6H_5$) | H | Me | Me | 2PO/3EO |
| 71 | Ni | 4 | tetra-($OC_6H_5$) | H | Me | Me | 2BO/3EO |
| 72 | Ni | 4 | tetra-($SC_6H_5$) | Me | Me | Me | 2BO/3EO |
| 73 | Co | 4 | H | H | Me | Me | 4PO |
| 74 | Co | 4 | H | H | Me | Me | 3PO |
| 75 | Co | 4 | H | H | Me | Me | 3PO |
| 76 | Co | 2 | di-OMe | H | Me | Me | 4PO/3EO |
| 77 | Co | 2 | di-($OC_6H_5$) | H | Me | Me | 8PO/2EO |
| 78 | Co | 4 | tetra-($OC_6H_5$) | H | Me | Me | 2PO/4EO |
| 79 | Co | 4 | tetra-($SC_6H_5$) | H | Me | Me | 3PO/1EO |

The invention has been described in detail with particular reference to preferred embodiments thereof, but it will be understood that variations and modifications will be effected within the spirit and scope of the invention.

We claim:

1. A colorant having the formula A—($SO_2$—N($R_2$)—Y$)_n$, wherein A is non-ionic metallophthalocyanine chromophore of Cu, Ni or Al; n is 1–4;

wherein $R_2$ is hydrogen, C1–C6 alkyl or cycloalkyl, phenyl, benzyl or Y; and

Y is a poly(oxyalkylene) moiety comprising at least three monomeric units selected from the formula (—RO—), wherein each R is an alkylene of 2–4 carbons, and Y is terminated with a group selected from hydrogen; alkyl, cycloalkyl, acyl of a carboxylic acid, mono- or di- hydroxyalkyl and alkoxyalkyl groups containing from 1–12 carbon atoms; phenyl; and groups having the formula:

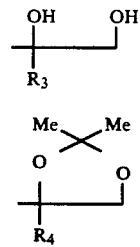

where $R_3$ and $R_4$ are selected from hydrogen, methyl and ethyl; provided that the total number of said (—RO—) monomeric units per colorant molecule is greater than 16.

2. The colorant of claim 1 wherein Y is terminated with a group selected from hydrogen, alkyl, acyl of a carboxylic acid, mono- or di- hydroxyalkyl and alkoxyalkyl groups containing from 1–4 carbon atoms; phenyl; and groups having the formula:

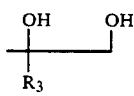

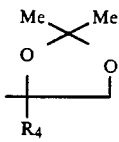

where $R_3$ and $R_4$ are selected from hydrogen, methyl and ethyl.

3. The colorant of claim 2 wherein $R_2$ is selected from hydrogen, methyl and ethyl.

4. The colorant of claim 3 wherein A is a metallophthalocyanine chromophore of Cu.

5. A colorant having the formula $A-(SO_2-N(R_2)-Y)_n$, wherein A is non-ionic metallophthalocyanine chromophore of Cu, Ni or Al;

n is 1-4;

wherein $R_2$ is hydrogen, C1-C6 alkyl or cycloalkyl, phenyl, benzyl or Y; and

Y is a poly(oxyalkylene) moiety comprising at least three monomeric units selected from the formula (—RO—), wherein each R is an alkylene of 2-4 carbons, and Y is terminated with a group selected from hydrogen; alkyl of a carboxylic acid, cycloalkyl, acyl mono- or di-hydroxyalkyl and alkoxyalkyl groups containing from 1-12 carbon atoms; phenyl; and groups having the formula:

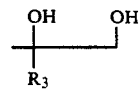

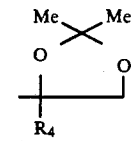

where $R_3$ and $R_4$ are selected from hydrogen, methyl and ethyl; provided that the total number of said (—RO—) monomeric units per colorant molecule is greater than 18.

6. The colorant of claim 5 wherein Y is terminated with a group selected from hydrogen, alkyl, acyl of a carboxylic acid, mono- or di- hydroxyalkyl and alkoxyalkyl groups containing from 1-4 carbon atoms; phenyl; and groups having the formula:

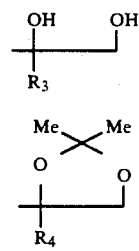

where $R_3$ and $R_4$ are selected from hydrogen, methyl and ethyl.

7. The colorant of claim 6 wherein $R_2$ is selected from hydrogen, methyl and ethyl.

8. The colorant of claim 7 wherein A is a metallophthalocyanine chromophore of Cu.

* * * * *